US008159731B2

(12) United States Patent
Sato et al.

(10) Patent No.: US 8,159,731 B2
(45) Date of Patent: *Apr. 17, 2012

(54) IMAGE READING DEVICE

(75) Inventors: Yuji Sato, Nagoya (JP); Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 939 days.

This patent is subject to a terminal disclaimer.

(21) Appl. No.: 12/010,965

(22) Filed: Jan. 31, 2008

(65) Prior Publication Data

US 2008/0180761 A1 Jul. 31, 2008

(30) Foreign Application Priority Data

Jan. 31, 2007 (JP) ................................. 2007-022389

(51) Int. Cl.
*H04N 1/04* (2006.01)
(52) U.S. Cl. ......... 358/497; 358/486; 358/474; 358/498
(58) Field of Classification Search .................. 358/497, 358/474, 486, 498, 501, 505
See application file for complete search history.

(56) References Cited

U.S. PATENT DOCUMENTS

| 5,301,043 | A  | * | 4/1994  | Ichikawa ....................... 358/498 |
| 6,603,514 | B1 |   | 8/2003  | Tsai et al. |
| 6,608,705 | B1 |   | 8/2003  | Oshima et al. |
| 6,687,420 | B1 | * | 2/2004  | Matsuda et al. ............... 382/286 |
| 7,119,934 | B2 |   | 10/2006 | Yoshida et al. |
| 7,128,270 | B2 | * | 10/2006 | Silverbrook et al. ..... 235/472.01 |
| 7,162,172 | B2 | * | 1/2007  | Grace et al. ....................... 399/49 |
| 7,235,769 | B2 |   | 6/2007  | Uemura |
| 2001/0043375 | A1 | | 11/2001 | Yokota |
| 2002/0121590 | A1 | | 9/2002  | Yoshida et al. |
| 2004/0165225 | A1 | | 8/2004  | Harris et al. |
| 2004/0169895 | A1 | | 9/2004  | Hashizume et al. |
| 2005/0231770 | A1 | * | 10/2005 | Seo ............................... 358/497 |
| 2006/0028700 | A1 | | 2/2006  | Chi-Sheng et al. |
| 2010/0118343 | A1 | * | 5/2010  | Migishima .................. 358/1.15 |

FOREIGN PATENT DOCUMENTS

| JP | H01-174160 A | 7/1989 |
| JP | H09-163090 A | 6/1997 |
| JP | H09-219772 A | 8/1997 |

(Continued)

OTHER PUBLICATIONS

European Patent Office, European Search Report in counterpart Patent Application No. EP 08001738, mailed Jul. 2, 2009.

(Continued)

*Primary Examiner* — Negussie Worku
(74) *Attorney, Agent, or Firm* — Baker Botts L.L.P.

(57) ABSTRACT

An image reading device according to one aspect of the invention comprises: a conveying unit configured to convey a recording medium; a first transmissive portion having a first surface that allows the recording medium to pass through the first surface; a second transmissive portion having a second surface on which a recording medium is allowed to be placed; an image reading unit comprising a line sensor extending in a first direction and movable on a second path, the second path continuously extending below the first transmissive portion and the second transmissive portion; and a driver configured to move the image reading unit on the second path. A relative distance of a third direction perpendicular to the first and second directions between the line sensor and the first surface changes in the second path below the first transmissive portion.

20 Claims, 22 Drawing Sheets

FOREIGN PATENT DOCUMENTS

| | | |
|---|---|---|
| JP | H09-321946 A | 12/1997 |
| JP | H10-004474 A | 1/1998 |
| JP | H11-146140 A | 5/1999 |
| JP | H11-239249 A | 8/1999 |
| JP | 2000-261625 A | 9/2000 |
| JP | 2000-351482 A | 12/2000 |
| JP | 2002-262032 | 9/2002 |
| JP | 2004-056583 A | 2/2004 |
| JP | 2004-266656 A | 9/2004 |
| JP | 2005-051304 A | 2/2005 |
| JP | 2006-211353 A | 8/2006 |

OTHER PUBLICATIONS

Japan Patent Office, Notification of Reasons for Refusal for Japanese Patent Application No. 2007-022389, dispatched May 17, 2011.

Japan Patent Office, Office Action for Japanese Patent Application No. 2007-022450, dated May 17, 2011.

Japan Patent Office, Office Action for Japanese Patent Application No. 2007-049979, dated May 17, 2011.

* cited by examiner

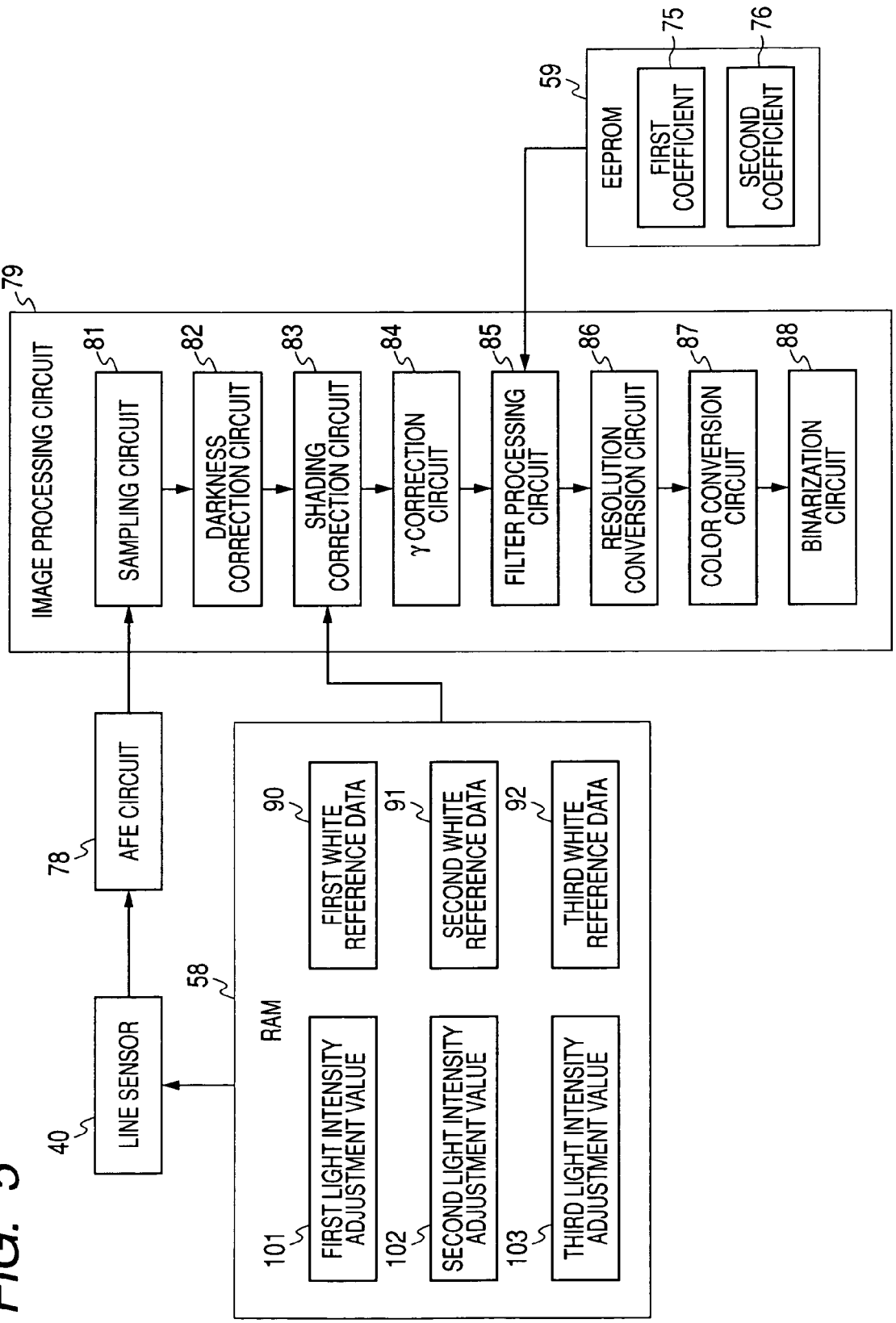

75 lpi

39

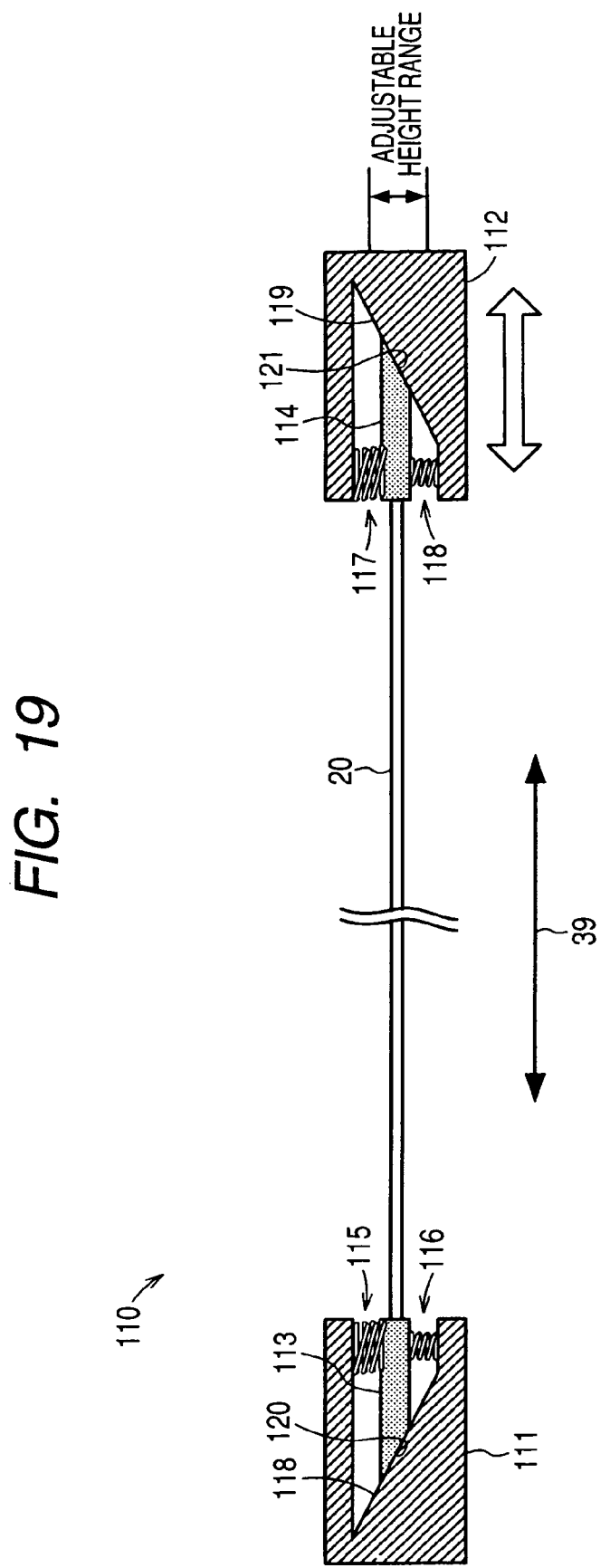

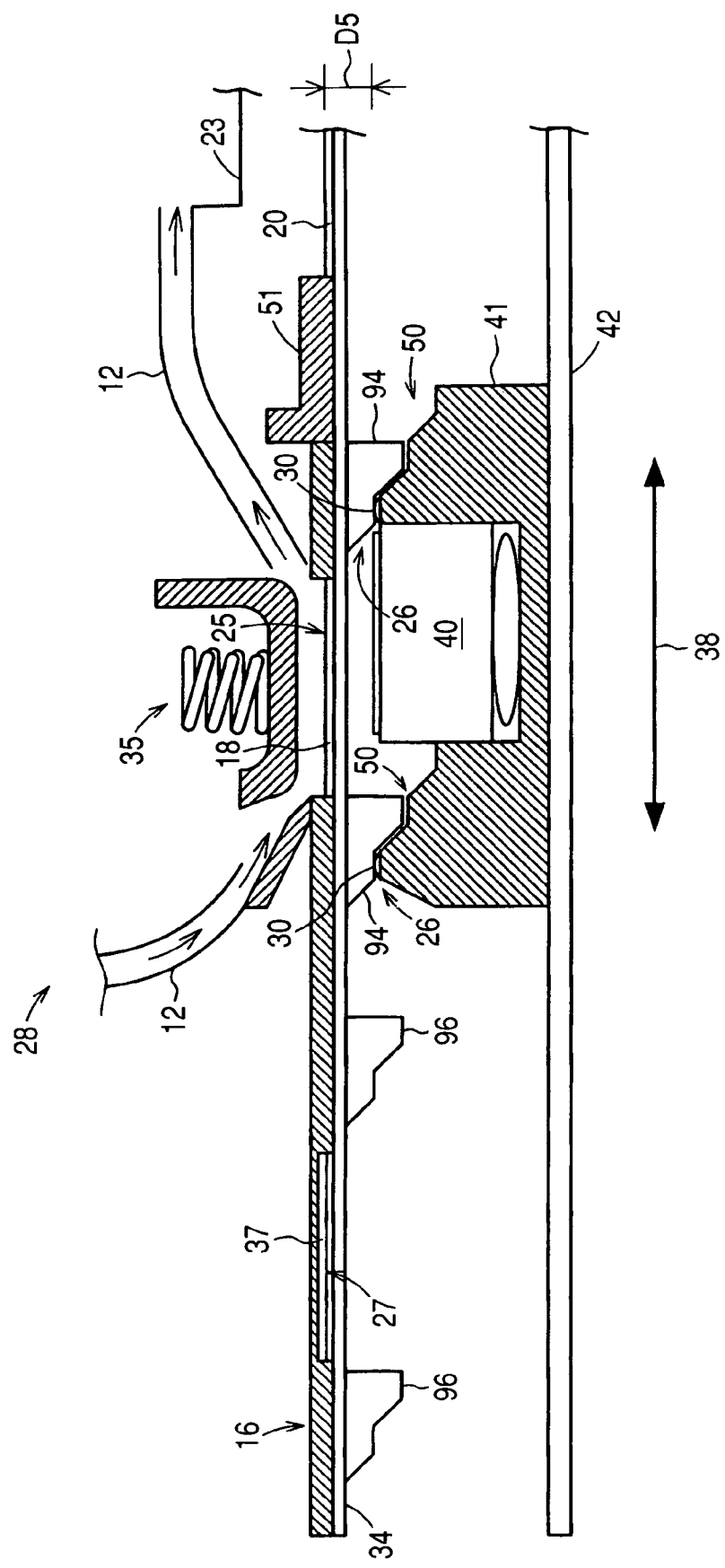

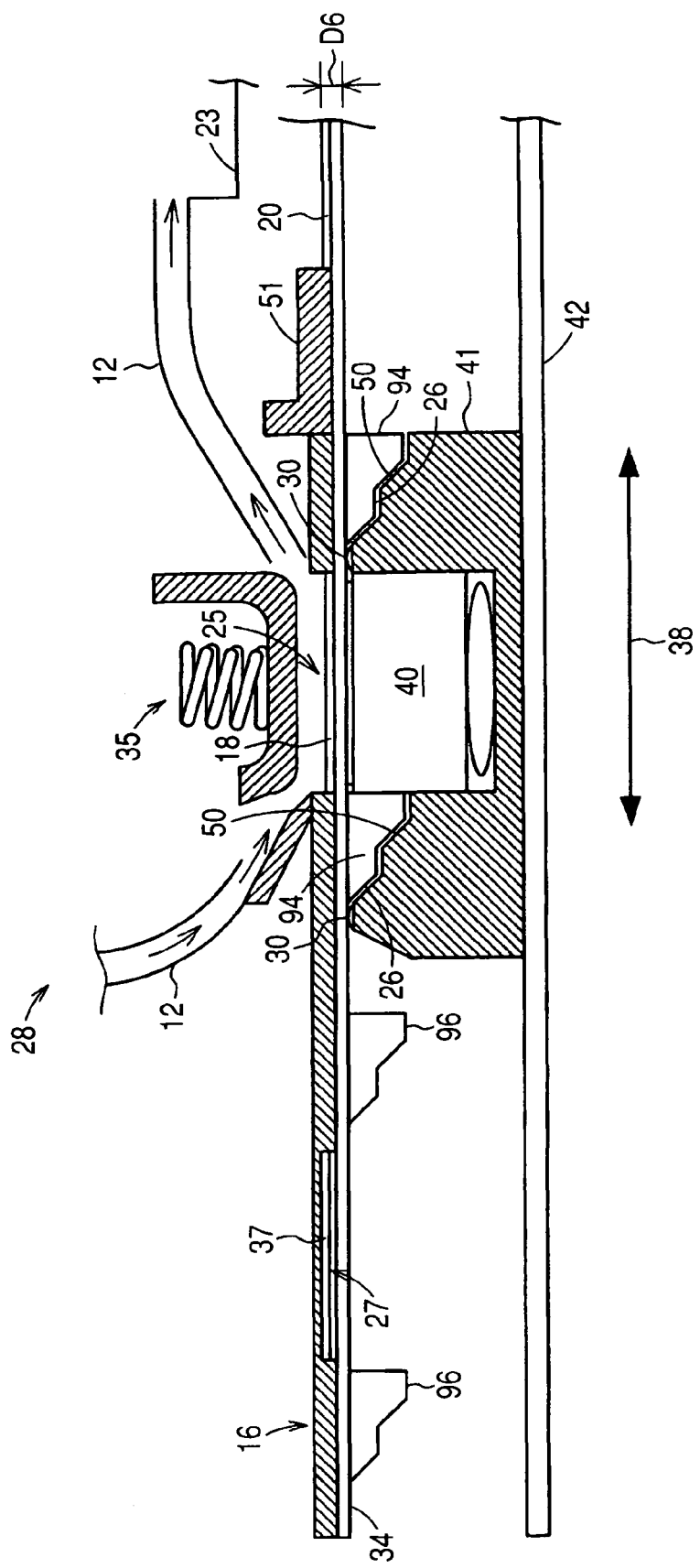

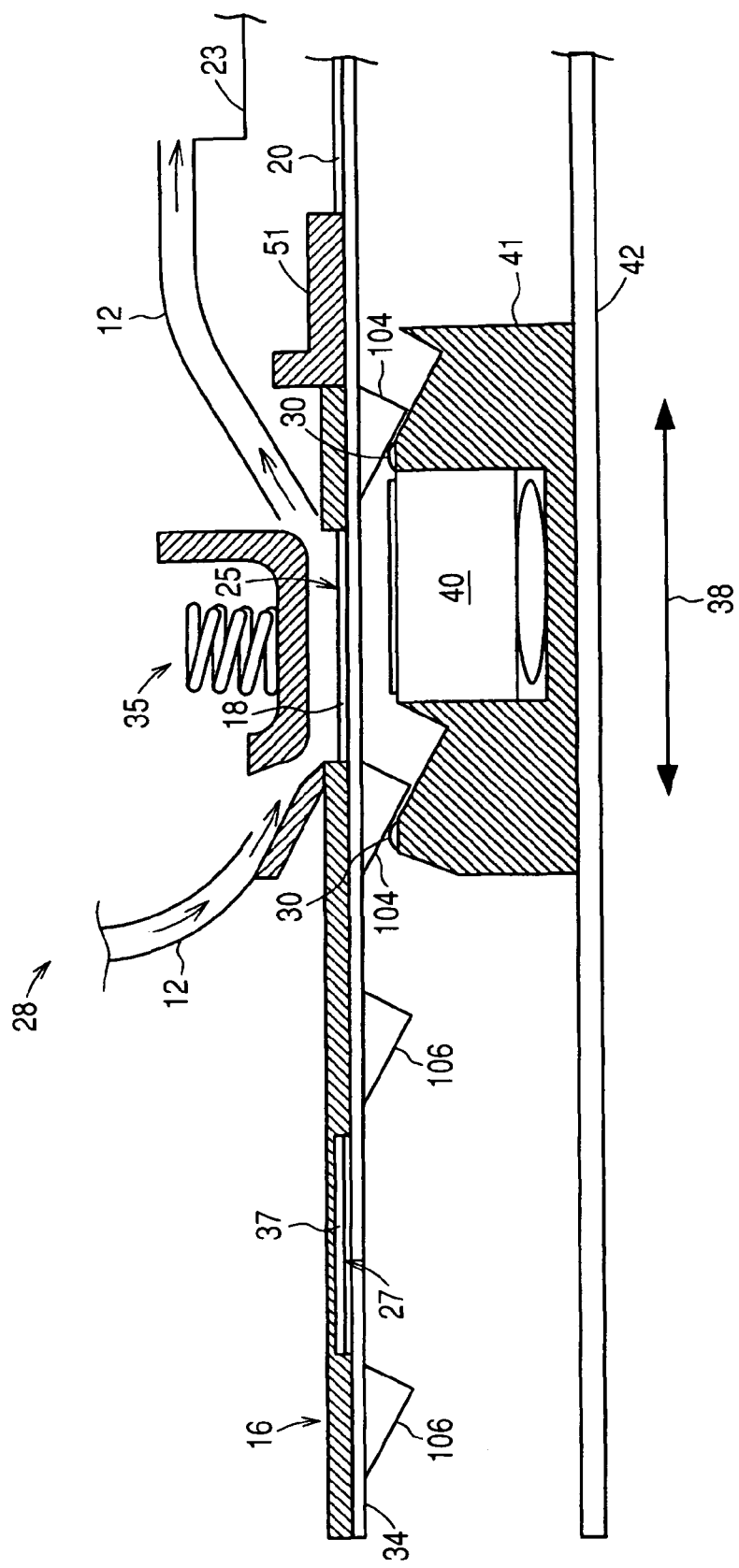

IMAGE READING DEVICE

CROSS-REFERENCE TO RELATED APPLICATIONS

This application is based upon and claims the benefit of priority from Japanese Patent Application No. 2007-022389, filed on Jan. 31, 2007, the entire contents of which are incorporated herein by reference.

TECHNICAL FIELD

One aspect of the present invention relates to an image reading device including an auto document feeder (ADF) and a flat bed scanner (FBS).

BACKGROUND

An image reading device having an auto document feeder (hereinafter, simply referred to as "ADF") and a flat bed scanner (hereinafter, simply referred to as "FBS") is known. The image reading device includes a close-contact line sensor such as a contact image sensor (CIS) reciprocating relative to a platen glass. A document placed on the platen glass is optically read by the line sensor while the line sensor moves along the platen glass. The document placed on a document bed of the ADF is optically read by the line sensor disposed at a predetermined reading position while the document is being conveyed along a conveying passage.

The above-mentioned line sensor is a reading device having a small focal distance and thus a small focused area. Accordingly, for example, in an image reading device using a contact image sensor (CIS) as a reading device, an adjustment of a relative distance between the CIS and a reading surface of a document is necessary to focus the CIS. For example, JP-A-2002-262032 discloses an image reading device that changes a height of the CIS to adjust a relative distance.

The image reading device disclosed in JP-A-2002-262032 includes a rail of which the longitudinal direction is a moving direction of the CIS. The CIS moves over the rail along the rail. A cross-section of the rail in a direction perpendicular to the longitudinal direction (axis direction) thereof is elliptical and the rail rotates around the axial direction by means of an operation of a lever, thereby serving as a disc cam. The CIS vertically moves with the rotation of the rail and thus gets close to or apart from a platen glass. That is, the relative distance between the CIS and the reading surface of a document on the platen glass is changed by means of the operation of the lever. JP-A-2002-262032 also discloses that a jack is disposed between the CIS and a supporting plate for mounting the CIS, and the CIS vertically moves by the use of the jack by operating a knob.

In the image reading device described in JP-A-2002-262032, a driving mechanism for rotationally driving the rail is required to adjust the relative distance between the reading surface of a document and the line sensor. When the driving mechanism is activated not manually but automatically, a driving source such as a motor is also required. Accordingly, the configuration is more complicated than that of an image reading device not having such a driving mechanism, which increases the cost for manufacturing the image reading device. Similar is caused in adjusting the relative distance between a document conveyed by an ADF and the line sensor.

SUMMARY

One aspect of the invention is conceived by the above-mentioned circumstances. It is an object of one aspect of the invention to provide an image reading device capable of easily changing a relative distance between a close-contact line sensor for reading a conveyed document and a reading surface of a document without providing an additional driving mechanism.

According to a first aspect of the invention, there is provided an image reading device comprising: a conveying unit configured to convey a recording medium on a first path; a first transmissive portion having a first surface that allows the recording medium to pass through the first surface; a second transmissive portion having a second surface on which a recording medium is allowed to be placed; an image reading unit comprising a line sensor extending in a first direction and movable on a second path, the second path continuously extending below the first transmissive portion and below the second transmissive portion, the image reading unit configured to read an image of the recording medium passed through the first surface and an image of the recording medium placed on the second surface; and a driver configured to move the image reading unit on the second path, wherein the second path below the second transmissive portion extends along the second surface in a second direction perpendicular to the first direction, and wherein a relative distance of a third direction perpendicular to the first and second directions between the line sensor and the first surface changes in the second path below the first transmissive portion.

According to a second aspect of the invention, there is provided an image reading device comprising: a conveying unit configured to convey a recording medium on a first path; a transmissive portion having a first surface disposed in a middle of the first path to allow the recording medium to pass through the first surface; an image reading unit comprising a line sensor extending in a first direction and movable along the first surface in a second direction perpendicular to the first direction, the line sensor configured to read an image of the recording medium passed through the first surface at a reading position; and a driver configured to move the image reading unit in the second direction, wherein a relative distance of a third direction perpendicular to the first and second directions between the line sensor and the first surface changes depending on positions with respect to the second direction of the image reading unit.

BRIEF DESCRIPTION OF THE DRAWINGS

FIG. 5 is a block diagram illustrating a configuration of an image processing circuit;

FIG. 6A shows a reading position corresponding to a first position, FIG. 6B shows a reading position corresponding to a second position, and FIG. 6C shows a reading position corresponding to a third position;

FIG. 19 is a diagram schematically illustrating a lifting mechanism of a second glass;

FIG. 20 is a cross-sectional view schematically illustrating a part of a conveying passage in a scanner according to a second embodiment of the invention;

FIG. 21 is a cross-sectional view schematically illustrating a part of the conveying passage in the scanner according to the second embodiment of the invention; and FIG. 22 is a cross-sectional view schematically illustrating a first spacer and a second spacer.

DESCRIPTION

Hereinafter, embodiments of the invention will be described with reference to the attached drawings. The embodiments are only examples of the invention and may be properly modified without departing from the scope of the claims.

First Embodiment

Figure 1:
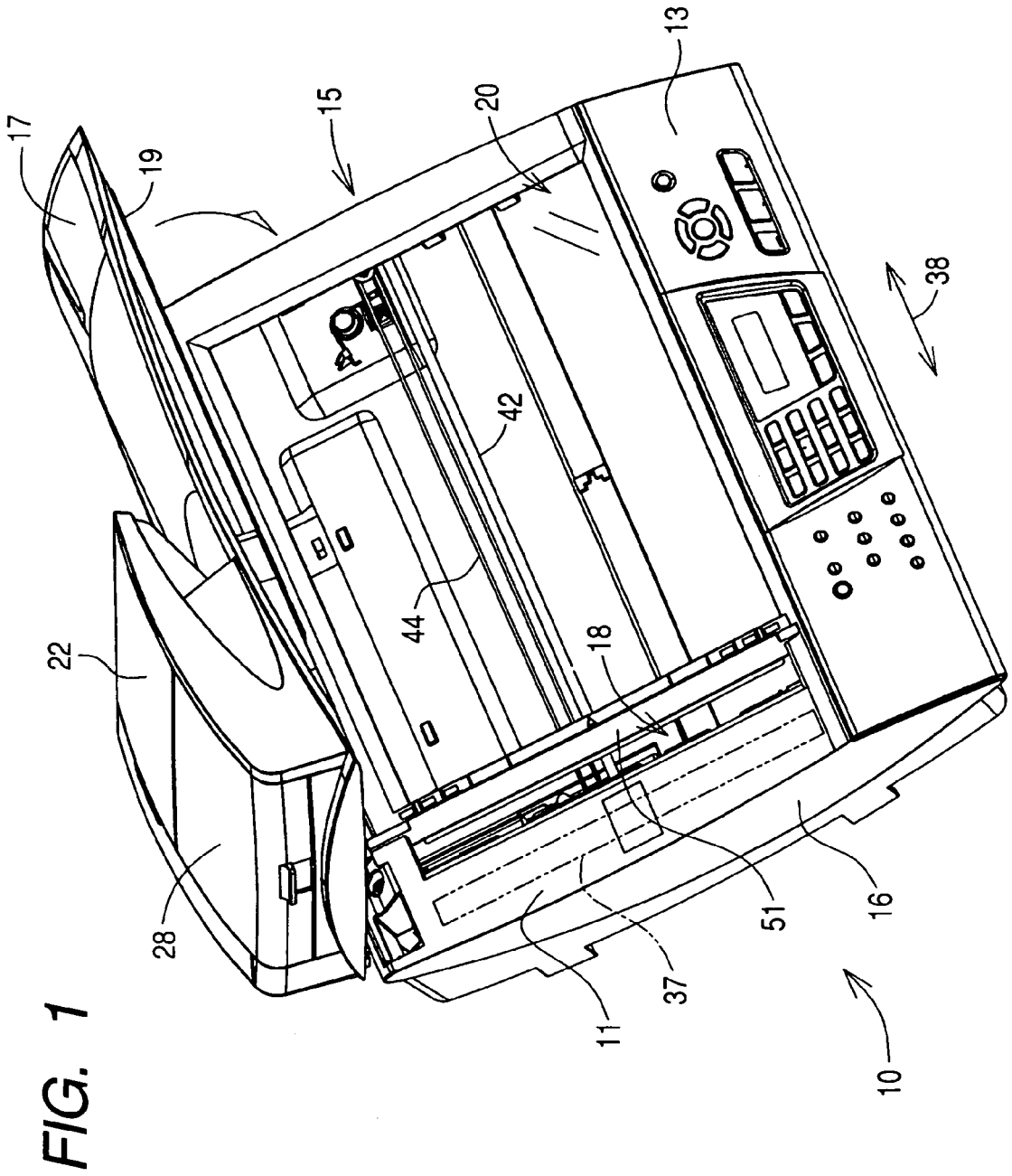
FIG. 1 is a perspective view illustrating an outer configuration of a scanner according to a first embodiment of the invention, where a document cover is opened.

FIG. 1 is a perspective view illustrating an outer shape of a scanner 10 according to a first embodiment of the invention, where a document cover 17 is opened.

The scanner 10 (an example of a image reading device) has a scanner function of reading an image of a document (an example of a recording medium, such as paper). In this embodiment, the scanner 10 having only the scanner function is used to explain the invention. However, the image reading device according to the invention is not limited to the scanner 10. The image reading device may be embodied as various kinds of devices having scanner function, such as a copier, a facsimile, or a multi-function device having plural functions.

As shown in FIG. 1, the scanner 10 includes a document bed 11. The document bed 11 serves as a flat bed scanner (FBS). The document bed 11 includes a substantially rectangular chassis 15. A line sensor 40 (see FIGS. 2 and 3) is disposed in the chassis 15. In the scanner 10, an image of a document is read by the line sensor 40.

As shown in FIG. 1, the scanner 10 includes a document cover 17. The document cover 17 is configured to bring a document placed on a surface (an example of a second surface) of a second glass 20 (an example of a second transmissive portion), which is described later, into close contact with the second glass 20. The document cover 17 can be freely opened and closed with respect to the document bed 11. Specifically, the document cover 17 is rotatably connected to the document bed 11 through a hinge (not shown) on the rear side of the document bed 11. The document cover 17 includes an auto document feeder (ADF) 28.

Figure 2:
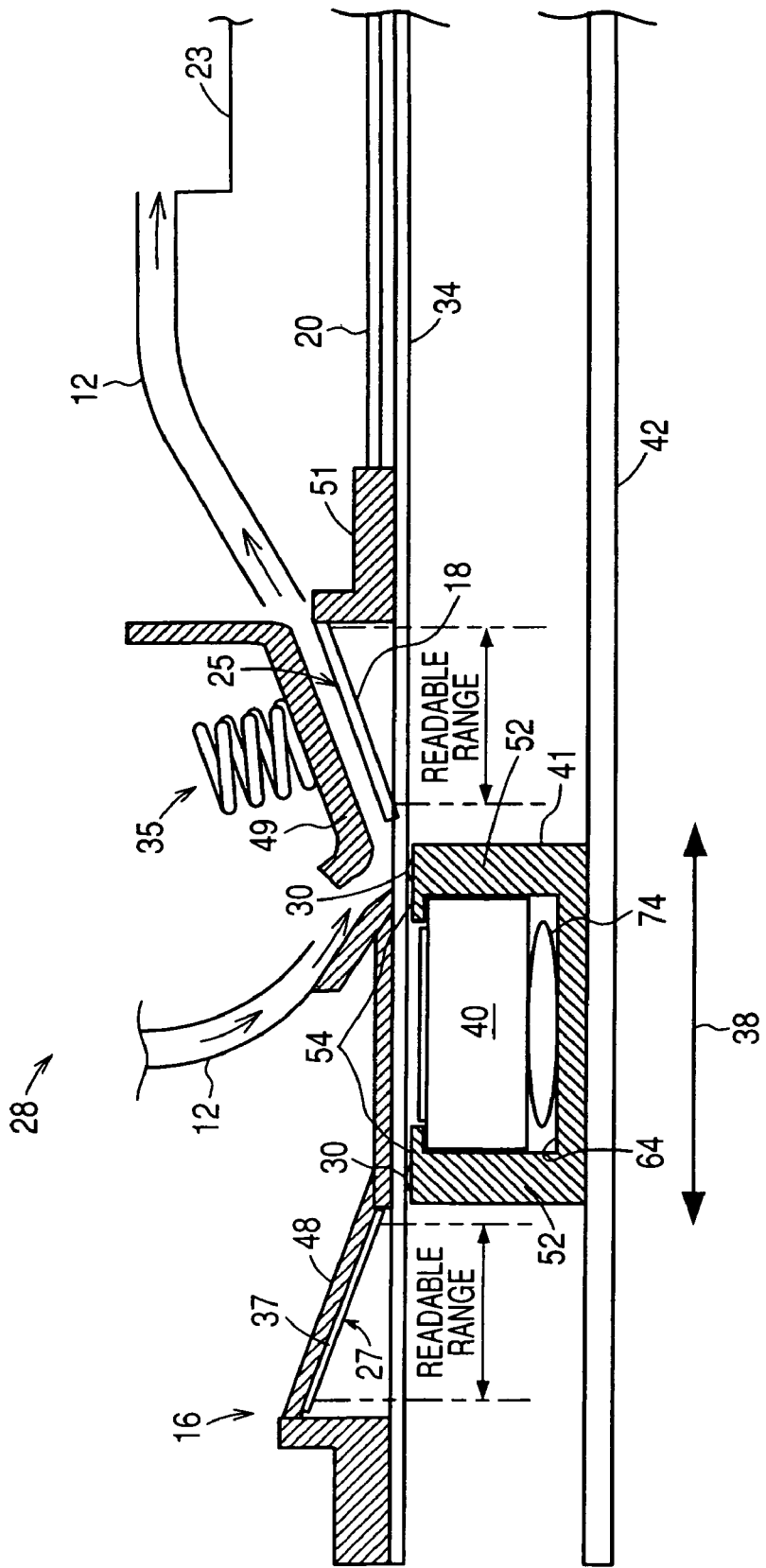
FIG. 2 is a cross-sectional view schematically illustrating a part of a conveying passage of the scanner according to the first embodiment of the invention.

FIG. 2 is a cross-sectional diagram schematically illustrating a part of a conveying passage 12 (an example of a first path) in the scanner 10 according to the first embodiment of the invention.

As shown in FIGS. 1 and 2, the ADF 28 is configured to convey a document placed on a document tray 22 to a sheet discharging tray 23 along the conveying passage 12. That is, the conveying passage 12 is a passage along which a document is conveyed. In FIG. 2, illustration of the document tray 22 and a part of the conveying passage 12 close to the document tray 22 are omitted. The document tray 22 (see FIG. 1) and the sheet discharging tray 23 (see FIG. 2) are disposed in the document cover 17 to form two steps with respect to the vertical direction so that the document tray 22 is disposed upside. The conveying passage 12 is disposed in the ADF 28 to have a substantially lateral U shape in a longitudinal section. The conveying passage 12 is formed continuous as a passage with a predetermined width, which allows a pass of a document, by members constituting the body of the ADF 28 or guide plates and guide ribs. The document tray 22 is connected to the sheet discharging tray 23 through the conveying passage 12.

Plural rollers 73 (an example of conveying unit; see FIG. 4) for conveying a document is disposed in the conveying passage 12. Although not shown in the figure, the rollers 73 include a pickup roller, a separation roller, a conveying roller, and a discharge roller. A driving force is delivered to the rollers 73 from a single motor 72 (see FIG. 4). The rotation power of the rollers 73 is delivered to the document, and the document is conveyed from the document tray 22 to the sheet discharging tray 23 along the conveying passage 12. As shown in FIG. 2, a first glass 18 (an example of a first transmissive portion) is disposed in the middle of the conveying passage 12. In a state where the document cover 17 is closed, the document placed on the document tray 22 is conveyed along the conveying passage 12 by the ADF 28 and passes over the first glass 18. At this time, an image of the document is read by the line sensor 40 positioned below the first glass 18. The document is further conveyed and discharged onto the sheet discharging tray 23.

As shown in FIG. 1, the first glass 18 and the second glass 20 are disposed on the top surface of a top cover 16 that forms a part of the chassis 15. The first glass 18 is a transmissive plate such as a glass plate or an acryl plate. When a document is placed on the document tray 22 and it is instructed to start reading the document, the line sensor 40 is located at a position (for example, see FIGS. 6A to 6C) opposed to the first glass 18. The document on the document tray 22 is conveyed along the conveying passage 12 by the ADF 28. In the course, the image of the document conveyed over the first glass 18 is read by the line sensor 40 through the first glass 18.

A document is placed on the second glass 20 (see FIG. 1) when the document bed 11 is used as the FBS. The second glass 20 is a transmissive plate such as a glass plate or an acryl plate. When a document is set on the second glass 20 and it is instructed to start reading the document, the line sensor 40 moves in a sub-scanning direction (an example of a second direction; direction indicated by an arrow 38) of a document while opposing to the second glass 20. In the course, the image of the document on the second glass 20 is read by the line sensor 40 through the second glass 20.

A partitioning member 51 (see FIGS. 1 and 2) is disposed between the first glass 18 and the second glass 20 on the top surface of the document bed 11. The partitioning member 51 is a longitudinal member extending in a depth direction (direction indicated by an arrow 39) of the scanner 10, similarly to the first glass 18 and the second glass 20. As shown in FIG. 2, the partitioning member 51 has a substantially L shape in cross-section in the width direction of the scanner 10. One end (right side in FIG. 2) in the width direction of the first glass 18 is supported by the partitioning member 51. The partitioning member 51 is used as a positioning reference at the time of setting a document on the second glass 20. Marks indicating a center position and both end positions of various document sizes such as an A4 (column A, number 4 in the Japanese Industrial Standards) size, a B5 (column B, number 5 in the Japanese Industrial Standards) size, and the like are recorded in the partitioning member 51. The document is set on the second glass 20 using the center position marked on the partitioning member 51 as a reference.

The top surfaces of the first glass 18 and the second glass 20 are exposed by opening the document cover 17 (see FIG. 1). By closing the document cover 17, the whole top surface of the document bed 11 including the first glass 18 and the second glass 20 is covered with the document cover 17. A document pressing member 19 (see FIG. 1) covering the second glass 20 is disposed on the bottom surface of the document cover 17. The document pressing member 19 is formed of a sponge and a white plate to press the document set on the second glass 20. When the document cover 17 is closed, the document set on the second glass 20 is pressed against the second glass 20 by the document cover 17 through the document pressing member 19. Since the first glass 18 is disposed on the top surface of the document bed 11, the first glass forms a part of the conveying passage 12 by closing the document cover 17. Accordingly, the ADF is used in a state where the document cover 17 is closed relative to the document bed 11.

Figure 3:
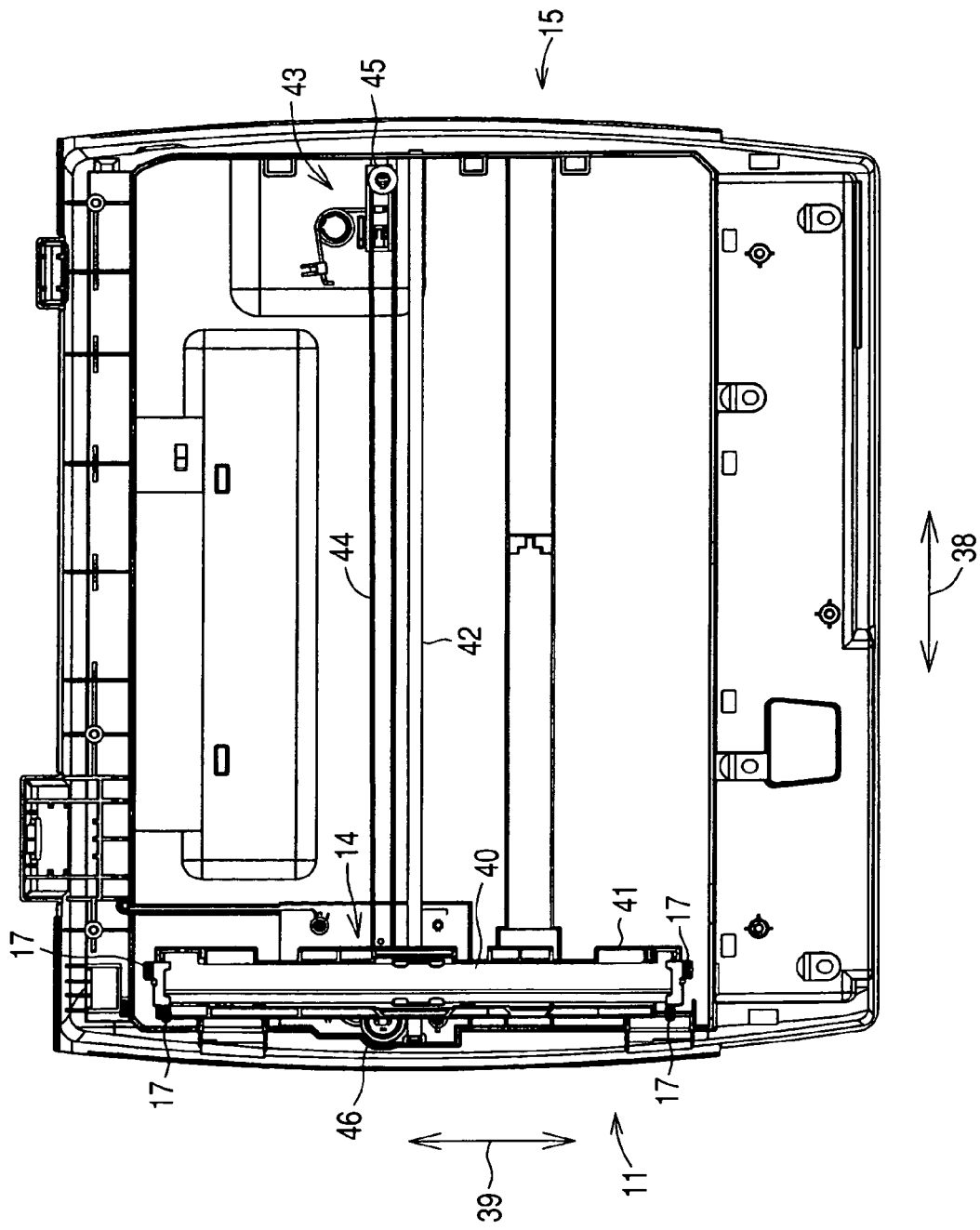
FIG. 3 is a plan view illustrating an inner configuration of a document bed.

FIG. 3 is a plan view illustrating an inner configuration of the document bed 11. In FIG. 3, a state where the top cover 16 is removed is shown.

As shown in FIG. 3, an image reading unit 14 is disposed inside the chassis 15 of the document bed 11. The image reading unit 14 is configured to read a document through the first glass 18 or the second glass 20. The image reading unit 14 includes the line sensor 40, a carriage 41, a guide shaft 42, and a belt driving mechanism 43.

The line sensor 40 applies light to a document from a light source and reads the reflected light from the document in the unit of a main scanning line. A reading device having a small focal distance is used as the line sensor 40. In this embodiment, the line sensor 40 is a so-called contact image sensor (CIS). Although not shown in the figure, the line sensor 40 includes a light source, a lens, and a light-receiving element.

The line sensor 40 applies light to a document from the light source through the first glass 18 and the second glass 20. That is, the line sensor 40 applies light to a document conveyed by the ADF 28 through the first glass 18 or applies light to a document set on the second glass 20 through the second glass 20. The line sensor 40 concentrates the reflected light from the document on the light-receiving element by the use of the lens and converts the light into an electrical signal (image signal). Accordingly, an image of the document is obtained. The light-receiving elements of the line sensor 40 are arranged, for example, in the main scanning direction (an example of a first direction; direction indicated by the arrow 39) in the unit of a chip. The light source and lens of the line sensor 40 are arranged in the same direction as the light-receiving elements.

The line sensor 40 is mounted on the carriage 41 (see FIG. 2). A guide shaft 42 is suspended in the width direction thereof (the lateral direction in FIG. 3) inside the chassis 15. The carriage 41 is fitted to the guide shaft 42. The carriage 41 is driven by the belt driving mechanism 43 so as to move along the guide shaft 42 in the direction indicated by the arrow 38. Rollers 30 (see FIGS. 2 and 3) are disposed on the top surface of the carriage 41 corresponding to both ends in the longitudinal direction of the carriage 41. The rollers 30 are axially supported by the carriage 41 in a state where it can be electrically driven in the moving direction (direction indicated by the arrow 38) of the carriage 41. The rollers 30 uniformly protrude upward from the top surface of the carriage 41. A guide member 34 (see FIG. 2) is disposed on the top surface of the chassis 15. The guide member 34 is a thin and longitudinal flat member extending in the moving direction of the carriage 40. The guide member 34 is disposed to extend along the trace of the rollers 30. The rollers 30 come in contact with the rear surface of the guide member 34 (see FIG. 2). Accordingly, a constant gap is formed between the top surface of the line sensor 40 and the rear surface of the second glass 20. The constant gap allows the line sensor 40 to be focused on the top surface of the second glass 20. The electrical driving of the rollers 30 allows the carriage 41 to smoothly move along the guide member 34. Since the line sensor 40 is mounted on the carriage 41, the line sensor 40 moves to positions opposing to the first glass 18 and the second glass 20.

The belt driving mechanism 43 (see FIG. 3) includes a driving belt 44, a driving pulley 45, and a driven pulley 46. As shown in FIG. 3, the driving pulley 45 and the driven pulley 46 are disposed at both ends in the width direction of the chassis 15, respectively. The driving belt 44 has an endless ring shape provided therein with saw-teeth and is suspended on the driving pulley 45 and the driven pulley 46. A driving force is delivered to the axis of the driving pulley 45 from a CR (carriage) motor 65 (an example of a driving unit; see FIG. 4). The driving belt 44 moves circumferentially by means of the rotation of the driving pulley 45 and the line sensor 40 mounted on the carriage 41 moves to be opposed to the first glass 18 or the second glass 20. For example, a stepping motor is used as the CR motor 65. The position of the line sensor 40 in the width direction of the scanner 10 (direction indicated by the arrow 39) is monitored by measuring the number of steps of the CR motor 65.

The document conveyed by the ADF 28 moves along the first glass 18. The document is read through the first glass 18 by the line sensor 40 disposed below the first glass 18. Accordingly, a document reading surface 25 (an example of a first surface; see FIG. 2) for the line sensor 40 is formed on the top surface of the first glass 18. Here, the reading surface 25 is a reading area of the line sensor 40 in the first glass 18. That is, an image of the document passing over the first glass 18 is read by the line sensor 40 in the reading area 25 on the top surface of the first glass 18. As shown in FIG. 2, the reading surface 25 is tilted with respect to a plane (which is a plane parallel to the paper surface of FIG. 3 and which is also referred to as "motion plane") in which the line sensor 40 moves. In this embodiment, a downstream portion (right side in FIG. 2) of the reading surface 25 in the conveying direction of the document in the conveying passage 12 is more apart from the motion plane in which the line sensor moves than an upstream portion (left side in FIG. 2) thereof (see FIG. 2). Accordingly, the document in conveyance is abutted and pressed on the first glass 18. As a result, it is possible to prevent the relative distance between the top surface of the line sensor 40 and the reading surface 25 from varying due to the floating of the document from the first glass 18.

The line sensor 40 moves to be opposed to the first glass 18 by means of the driving force delivered from the CR motor 65. The driving of the CR motor 65 is controlled by a controller 55 (see FIG. 4) to be described later. The controller 55 is operable as, for example, a control unit, a calculation unit, and a decision unit. As described above, the reading surface 25 of the first glass 18 is tilted about the motion plane. The controller 55 drives the CR motor 65 so as to move the line sensor 40 (carriage 41) in the direction indicated by the arrow 38. The position of the reading surface 25 moves in the width direction of the first glass 18 depending on the position of the line sensor 40 (see FIGS. 6A to 6C). Accordingly, the controller 55 changes the relative distance (hereinafter, also referred to as "first relative distance") between the document reading surface 25 of the first glass 18 and the line sensor 40 (see D1 to D3 in FIGS. 6A to 6C). Since the first relative distance is changed by the use of the CR motor 65 as a driving source of the line sensor 40, it is possible to change the first relative distance with a simple configuration. That is, the first relative distance is easily changed without adding a new member for changing the first relative distance. By changing the first relative distance, the focus of the line sensor 40 on the document reading surface 25 can be changed, thereby reading the document conveyed by the ADF 28.

The tilt angle of the reading surface 25 about the motion plane is not particularly limited. However, the tilt angle is set preferably on the basis of a modulation transfer function (MTF) characteristic of the line sensor 40. When the tilt angle increases, the change of the first relative distance with the movement of the line sensor 40 increases. On the contrary, when the tilt angle decreases, the change of the first relative distance with the movement of the line sensor 40 decreases. Accordingly, when a reading device having a very narrow in-focus range is used as the line sensor 40, it is preferable that the tilt angle should be set small. On the contrary, when a reading device having a wide in-focus range is used as the line sensor 40, the tilt angle may be set large. The first glass 18 may be disposed so that the upstream portion of the reading surface 25 in the document conveying direction in the conveying passage 12 is positioned to have larger distance from the motion plane the than the downstream portion thereof. However, the floating of the document from the reading surface 25 can be inhibited according to the configuration in this embodiment where the downstream portion of the reading surface 25 in the document conveying direction is positioned to have larger distance from the motion plane than the upstream portion thereof.

As shown in FIG. 2, a platen 49 is disposed above the first glass 18. A surface of the platen 49 opposed to the first glass 18 extends in the depth direction (direction indicated by the arrow 39) of the scanner 10 along the first glass 18. The platen 49 is attached to a member (not shown) forming the ADF 28 with a coil spring 35 interposed therebetween. Although not shown in the figure, both ends in the longitudinal direction of the platen 49 are provided with protrusions protruding toward the first glass 18. When the document cover 17 is closed, the first glass 18 and the platen 49 are opposed to each other with a predetermined gap therebetween by the use of the protrusions. The predetermined gap is set to be slightly larger than the thickness of the document. Accordingly, the document is smoothly conveyed along the first glass 18 with its movement not being regulated by the platen 49.

As shown in FIGS. 1 and 2, a reference member 37 (an example of a reference portion) is disposed on a side of the first glass 18 opposite to the second glass 20. The reference member 37 is provided on the rear surface of the top cover 16. The reference member 37 serves as a brightness reference of the line sensor 40 and an image thereof is read by the line sensor 40. That is, the reference member 37 is used to adjust the light intensity of the line sensor 40 or to obtain white reference data 90 to 92 (see FIG. 5). The adjustment of the light intensity and the acquisition of the white reference data 90 to 92 will be described in detail later. The reference member 37 is a thin band-like member having substantially the same length as the line sensor 40 in the main scanning direction of the line sensor 40 and its surface opposed to the line sensor 40 is white. The reference member 37 is attached to the rear surface of a tilted portion 48 formed in the top cover 16. The tilted portion 48 is tilted about the motion plane at the same tilt angle as the first glass 18. Accordingly, a reading surface 27 of the reference member 37 is tilted about the motion plane substantially at the same angle as the first glass 18. The reading surface 27 does not mean the whole rear surface of the reference member 37, but means a surface of the reference member 37 which is read by the line sensor 40. As shown in FIG. 2, the first glass 18 and the reference member 37 are tilted symmetrically in the width direction of the scanner 10.

The controller 55 changes the relative distance (hereinafter, also referred to as "second relative distance") between the reading surface 27 of the reference member 37 and the line sensor 40 by driving the CR motor 65 so as to allow the line sensor 40 (carriage 41) to move. Since the second relative distance is changed by the use of the CR motor 65 as a driving source of the line sensor 40, it is possible to change the second relative distance with a simple configuration. That is, the second relative distance can be easily changed without newly adding a member for changing the second relative distance between the line sensor 40 and the reference member 37. By changing the second relative distance, the focus of the line sensor 40 can be changed, thereby reading the reading surface 27.

As shown in FIG. 1, an operation panel 13 is disposed in a front top portion of the scanner 10. The operation panel 13 includes a liquid crystal display for displaying a variety of information and input keys by which a user can input information. The scanner 10 is operated in accordance with an operation input from the operation panel 13. A user's operation input instructing to start reading a document placed on the second glass 20 or a document placed on the document tray 22 is performed through the operation panel 13. In addition to the instruction from the operation panel 13, the scanner 10 may be connected to an external device such as a computer and may be operated in accordance with an instruction transmitted from the computer through a scanner driver or the like.

Figure 4:
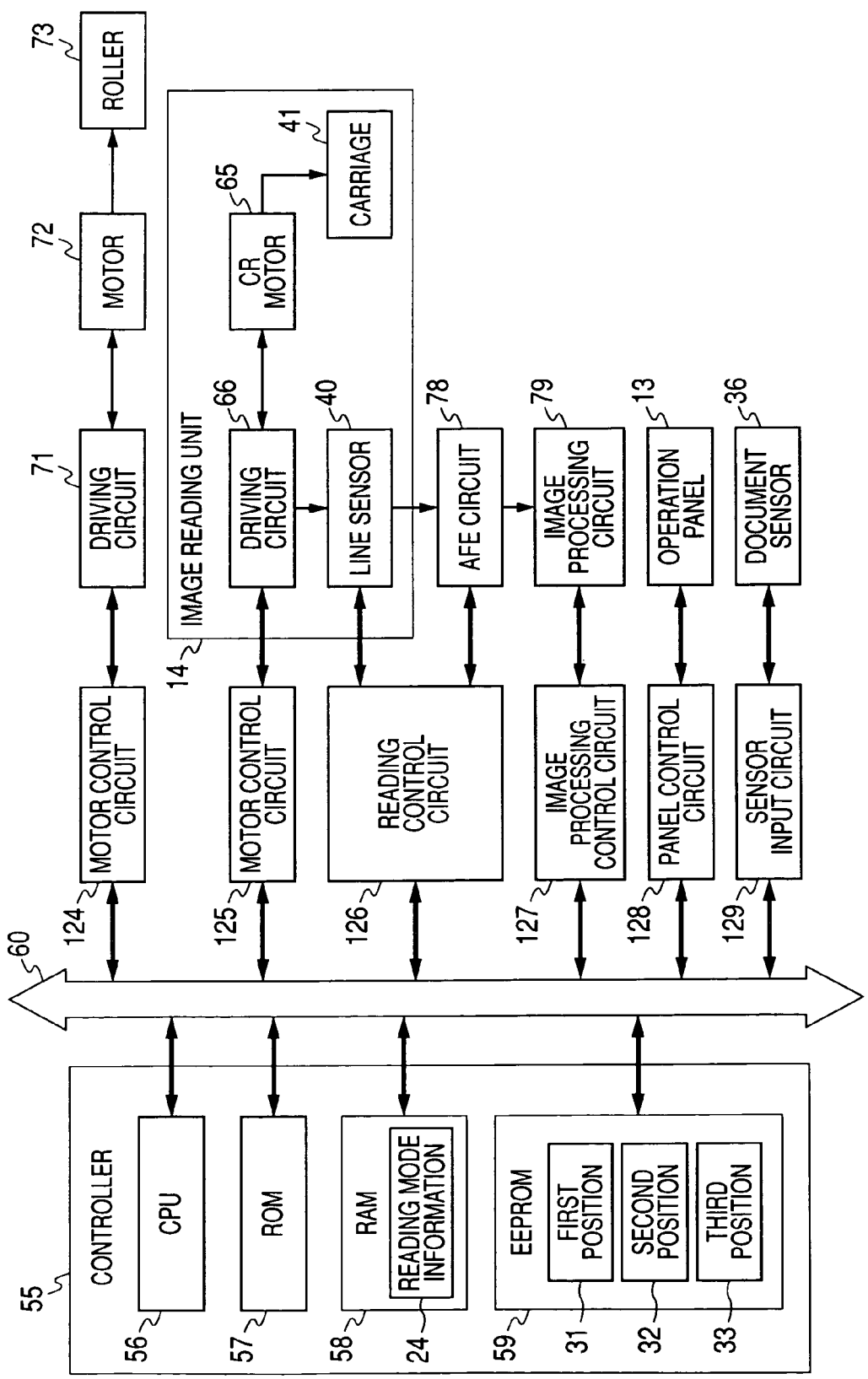
FIG. 4 is a block diagram illustrating a configuration of a controller 55 of the scanner.

FIG. 4 is a block diagram illustrating a configuration of the controller 55 of the scanner 10. FIG. 5 is a block diagram illustrating a configuration of an image processing circuit 79.

The controller 55 controls the entire operations of the scanner 10. As shown in FIG. 4, the controller 55 is formed of a micro computer mainly including a CPU (Central Processing Unit) 56, a ROM (Read Only Memory) 57, a RAM (Random Access Memory) 58, and an EEPROM (Electrically Erasable and Programmable ROM) 59. The controller 55 is connected to a motor control circuit 124, a motor control circuit 125, a reading control circuit 126, an image processing control circuit 127, a panel control circuit 128, and a sensor input circuit 129 through a bus 60.

The ROM 57 stores control programs for allowing the CPU 56 to control a variety of operations of the scanner 10. The RAM 58 is a memory area or an operating area for temporarily storing a variety of data used for the CPU 56 to execute the control programs. As shown in FIG. 5, the RAM 58 stores a first light intensity adjustment value 101, a second light intensity adjustment value 102, a third light intensity adjustment value 103, first white reference data 90, second white reference data 91, and third white reference data 92. These data will be described in detail later.

The RAM 58 stores reading mode information 24 (see FIG. 4). The reading mode information 24 is information indicating a document reading mode set on the basis of the operation input from the operation panel 13 by the controller 55. The reading of a document conveyed by the ADF 28 is performed on the basis of the reading mode information 24. In this embodiment, the controller 55 sets one of a normal mode, a moiré reducing mode, and a blur mode. The normal mode is a reading mode in which a document is read through the first glass 18 by the line sensor 40 in a state where the controller 55 makes the first relative distance be substantially equal to the focal distance of the line sensor 40. In other words, the normal mode is a reading mode in which a document is read in a state where the line sensor 40 is focused on the document reading surface 25 of the first glass 18. The moiré reducing mode and the blur mode are reading modes in which a document is read by the line sensor 40 through the first glass 18 in a state where the controller 55 makes the first relative distance be different from the focal distance of the line sensor 40. The moiré reducing mode is greatly different from the blur mode in the first relative distance. The moiré reducing mode is a reading mode in which a document is read in a state where the focus of the line sensor 40 is slightly out of the document reading surface 25 of the first glass 18. The blur mode is a reading mode in which at least an area of a document is read in a state where the focus of the line sensor 40 is slightly out of the reading surface 25 and the other area (a blurred area to be described later) of the document is read in a state where the focus of the line sensor 40 is greatly out of the reading surface 25.

The reading mode information 24 may be set on the basis of an instruction transmitted from a computer, instead of the operation input from the operation panel 13. Although it is described in this embodiment that includes three reading modes of the normal mode, the moiré reducing mode and the blur mode, but may include two modes of the normal mode and the moiré reducing mode or two modes of the normal mode and the blur mode.

The EEPROM 59 stores various settings or flags which should be kept even after it is turned off. In this embodiment, the EEPROM 59 stores a first position 31, a second position 32, and a third position 33. The position information is information indicating a reading position in the sub-scanning direction at which the line sensor 40 is positioned in association with the reading mode information 24 set in the RAM 58. The first position 31 is a reading position at which the line sensor 40 is focused on the reading surface 25. The second position 32 is a reading position at which the focus of the line sensor 40 is slightly out of the reading surface 25. The third position 33 is a reading position at which the focus of the line sensor 40 is more out of the reading surface 25 than that of the second position 32.

Figure 6A:
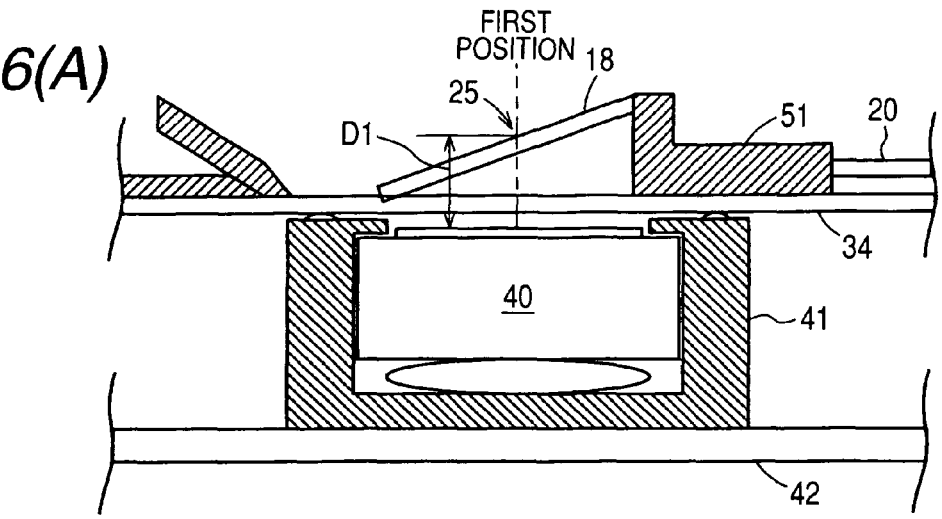
FIGS. 6A to 6C are cross-sectional views schematically illustrating reading positions of a line sensor, where
Figure 6B:
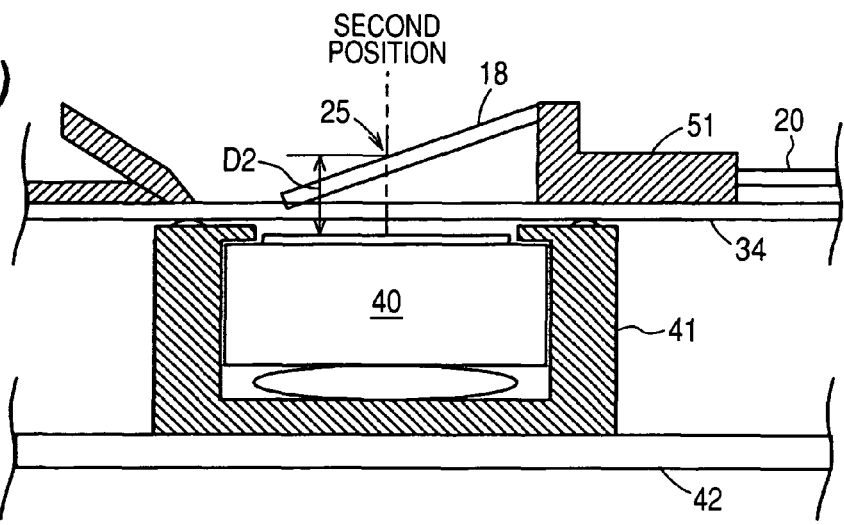
Figure 6C:
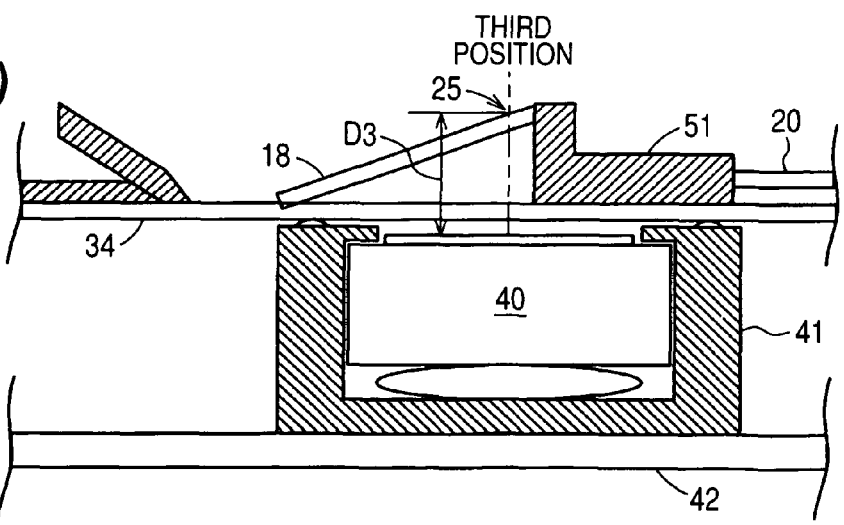
Figure 7:
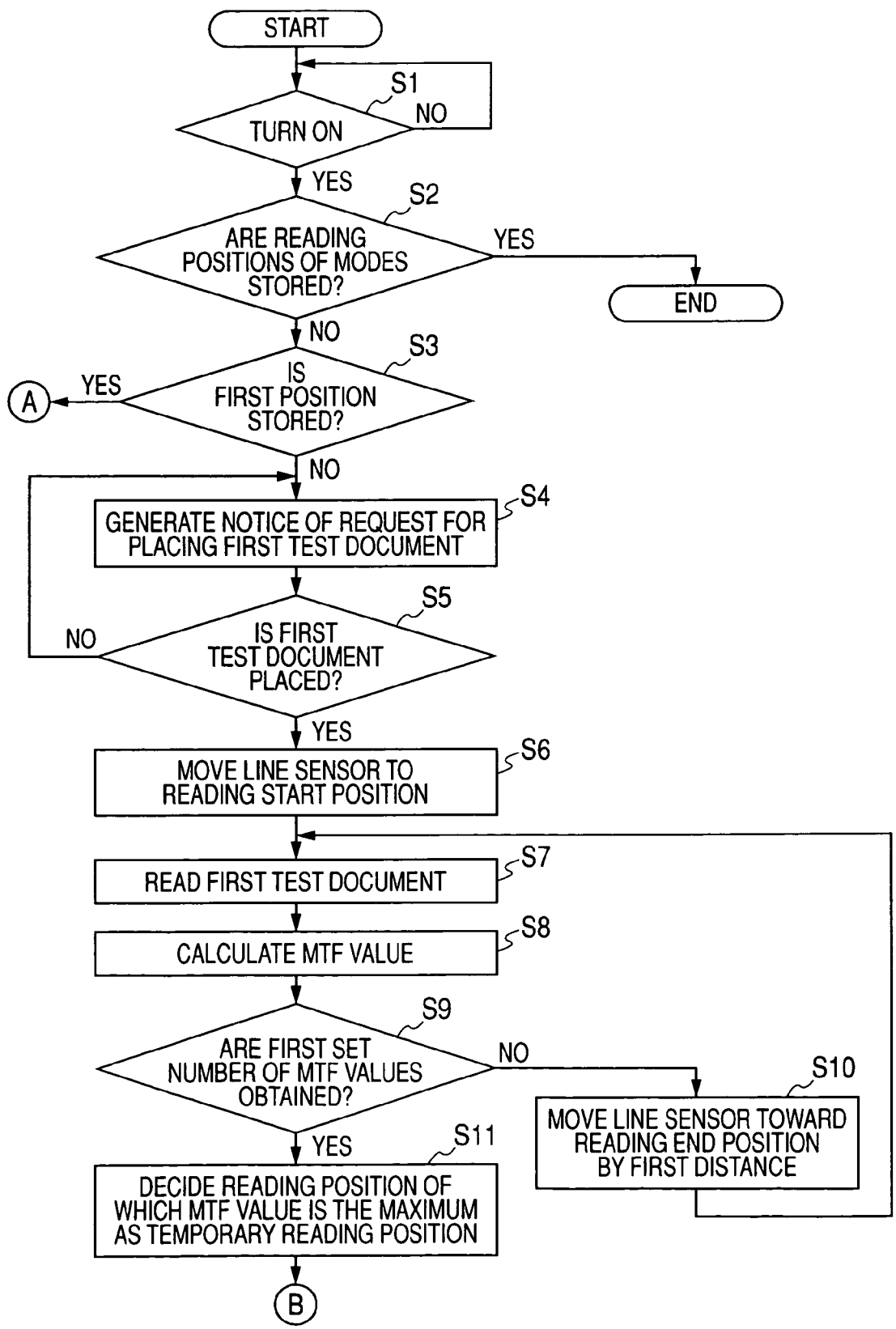
FIG. 7 is a flowchart illustrating a process flow of a reading position setting process performed at the time of turning on the scanner.

FIGS. 6A to 6C are cross-sectional views schematically illustrating the reading positions of the line sensor 40, where FIG. 6A shows a reading position corresponding to the first position 31, FIG. 6B shows a reading position corresponding to the second position 32, and FIG. 6C shows a reading position corresponding to the third position 33.

The reading mode information 24 of the RAM 58 is set to the normal mode and the document conveyed by the ADF 28 is read. The image of the document is read from the reading surface 25 in a state where the line sensor 40 is located at the reading position (see FIG. 6A) corresponding to the first position 31. Since the first position 31 is a position at which the line sensor 40 is focused on the reading surface 25, a clear document image with a high resolution is obtained. That is, the normal mode is a reading mode suitable for reading a photograph or the like in which the moiré hardly occurs.

The reading mode information 24 of the RAM 58 is set to the moiré reducing mode and the document conveyed by the ADF 28 is read. The image of the document is read from the reading surface 25 in a state where the line sensor 40 is located at a reading position (see FIG. 6B) corresponding to the second position 32. Since the second position 32 is a position at which the focus of the line sensor 40 is slightly out of the reading surface 25, a document image is obtained in which the occurrence of the moiré is suppressed. That is, the moiré reducing mode is a reading mode suitable for reading a dot document in which the moiré may easily occur.

The reading mode information 24 of the RAM 58 is set to the blur mode and the document conveyed by the ADF 28 is read. An image of the extra-dim area to be described later of the document is read in a state where the line sensor 40 is located at the reading position (see FIG. 6B) corresponding to the second position 32. An image of the other area (dim area) of the document is read in a state where the line sensor 40 is located at a reading position (see FIG. 6C) corresponding to the third position 33. Accordingly, a document image is obtained in which the occurrence of the moiré in the extra-dim area is suppressed and the image of the blurred area is too blurred to identify. That is, the blur mode is a reading mode suitable for reading a document of which a partial area is made to be blurred. The method of deciding the first position 31, the second position 32, and the third position 33 and the operations of reading the document in the reading modes will be described in detail later.

The image (image data) of the document read through the first glass 18 by the line sensor 40 is subjected to an emphasis process (sharpening process) by a filter processing circuit 85 (see FIG. 5) to be described later. Coefficients (emphasis coefficients) 75 and 76 used for the emphasis process are stored in the EEPROM 59. The first coefficient 75 and the second coefficient 76 will be described in detail later.

As shown in FIG. 4, the motor control circuit 124 is connected to a driving circuit 71. The motor control circuit 125 is connected to a driving circuit 66. The reading control circuit 126 is connected to the line sensor 40 and an AFE (Analog Front End) circuit 78. The image processing control circuit 127 is connected to an image processing circuit 79. The panel control circuit 128 is connected to the operation panel 13. The sensor input circuit 129 is connected to a document sensor 36.

The driving circuit 71 is configured to drive the motor 72. The motor 72 can rotate forward and backward. The driving circuit 71 receives an output signal from the motor control circuit 124 and generates a pulse signal for rotating the motor 72. The motor 72 rotates on the basis of the pulse signal. The motor 72 is configured to apply a driving force to the rollers 73 and serves as a driving source of the ADF 28. The controller 55 counts the number of pulses of the pulse signal generated by the driving circuit 71. Accordingly, the number of steps of the motor 72 is counted. The counted number of steps is temporarily stored in the RAM 58.

The image reading unit 14 performs a document reading operation and outputs a document image as an image signal. The image reading unit 14 includes the line sensor 40, the carriage 41, the CR motor 65, and the driving circuit 66. The driving circuit 66 delivers a driving signal to the CR motor 65 on the basis of a phase exciting signal input from the motor control circuit 125. The CR motor 65 is, for example, a stepping motor. The CR motor 65 rotates in response to the driving signal. Accordingly, the carriage 41 reciprocates. The driving circuit 66 is also configured to adjust an operating current for lighting the light source of the line sensor 40. The controller 55 obtains the light intensity adjustment values 101, 102, and 103 or the white reference data 90, 91, and 92, in addition to the document reading operation, by controlling the image reading unit 14 on the basis of the control programs stored in the ROM 57.

The line sensor 40 applies light from the light source to a document set on the second glass 20 or a document conveyed over the first glass 18 by the ADF 28 and reads the document image in the unit of a line. The read image is output as an image signal (image data) from the line sensor 40 to the AFE circuit 78.

The line sensor 40 is made to move by the carriage 41 so as to be opposed to the second glass 20 on which the document is set. In this course, the line sensor 40 repeats the operation of applying light to the document through the second glass 20 from the light source and outputting the reflected light from the document as an image signal of a line. Accordingly, the entire image of the document set on the second glass 20 is obtained.

The line sensor 40 is made to move by the carriage 41 and is located at a position opposed to the first glass 18. In this state, the document placed on the document tray 22 is conveyed along the conveying passage 12 by the ADF 28. In this course, the line sensor 40 repeats the operation of applying light to the document through the first glass 18 from the light source and outputting the reflected light from the document as an image signal of a line. Accordingly, the entire image of the document passing over the first glass 18 is obtained.

The AFE circuit 78 samples and holds analog image signals output from the line sensor 40, converts the sampled and held image signals into digital signals, and serializes the digital signals. The digital conversion is a process of converting the analog image signals output from the line sensor 40 into digital signals having a predetermined number of bits of digital codes. The digital conversion is performed by an analog/digital converter. The analog image signals input to the AFE circuit 78 are output as digital image signals of, for example, 8 bits (256 gray scales 0 to 255) to the image processing circuit 79.

As shown in FIG. 5, the image processing circuit 79 includes a sampling circuit 81, a darkness correction circuit 82, a shading correction circuit 83, a γ correction circuit 84, a filter processing circuit 85, a resolution conversion circuit 86, a color conversion circuit 87, and a binarization circuit 88.

The sampling circuit 81 samples an image signal output from the AFR circuit 78. The darkness correction circuit 82 corrects the image signal output from the sampling circuit 81 so as to correct the differences between the light-receiving elements of the line sensor 40. The correction of the image signal is performed on the basis of the black reference data stored in the RAM 58. The black reference data is data obtained by reading the reference member not shown in a state where the light source of the line sensor 40 is turned off.

The shading correction circuit 83 corrects the shading of the image signal output from the darkness correction circuit 82. By performing the shading correction, the differences between the light-receiving elements of the line sensor 40 and the non-uniformity of the light source are corrected. The shading correction of the shading correction circuit 83 is performed on the basis of any one of the white reference data 90, 91, and 92. The image signal of the document read in the state where the line sensor 40 is located at the reading position corresponding to the first position 31 is corrected in shading on the basis of the first white reference data 90. The image signal of the document read in the state where the line sensor 40 is located at the reading position corresponding to the second position 32 is corrected in shading on the basis of the second white reference data 91. The image signal of the document read in the state where the line sensor 40 is located at the reading position corresponding to the third position 33 is corrected in shading on the basis of the third white reference data 92.

The filter processing circuit 85 performs an emphasis (sharpening) process on the image signal of the document. The emphasis process is a process of emphasize a gray scale variation of the image signal of the document. The emphasis process is performed by subtracting a secondary differential value or the like from a noticed pixel. The filter processing circuit 85 emphasizes the image signal of the document by the use of Formula 1.

$$g(x, y) = \sum_{i=-1}^{1} \sum_{j=-1}^{1} f(x+i, y+j)h(i+1, j+1) \quad \text{[Formula 1]}$$

In Formula 1, g(x,y) is image data having been subjected to the emphasis process. f(x,y) is input image data input to the filter processing circuit 85. Here, h denotes a filter coefficient. The h for subtracting the secondary differential value from the noticed pixel can be expressed by Formula 2.

$$h = \begin{bmatrix} 0 & -k/4 & 0 \\ -k/4 & k+1 & -k/4 \\ 0 & -k/4 & 0 \end{bmatrix} \quad \text{[Formula 2]}$$

In Formula 2, the secondary differential value to be subtracted increases with an increase of k, thereby enhancing the degree of emphasis. Accordingly, k is referred to as an emphasis coefficient. In this embodiment, the emphasis coefficient k varies depending on the reading positions (first to third positions 31 to 33) at which the line sensor 40 is located. When the image signal of the document is obtained in a state where the line sensor 40 is located at the reading position corresponding to the first position 31, the first coefficient 75 is used as the emphasis coefficient k. When the image signal of the document is obtained in a state where the line sensor 40 is located at the reading position corresponding to the second position 32, the second coefficient 76 is used as the emphasis coefficient k. Regarding the coefficients 75 and 76, the second coefficient 76 is set to be larger than the first coefficient 75.

The γ correction circuit 84, the resolution conversion circuit 86, the color conversion circuit 87, and the binarization circuit 88 are known well and thus its description is omitted.

The panel control circuit 128 generates a signal for controlling the liquid crystal display of the operation panel 13 on the basis of the instruction from the controller 55. The panel control circuit 128 includes an interface circuit delivering information input from the operation panel 13 to the controller 55.

The sensor input circuit 129 removes noises from the output signal of the document sensor 36 (see FIG. 4) and outputs the resultant signal to a predetermined output destination. The document sensor 36 is configured to detect a document in the document tray 22 (see FIG. 1) and is disposed at a predetermined position in the document tray 22. The document sensor 36 is a mechanical sensor in this embodiment. The document sensor 36 includes a transmissive optical sensor (photo interrupter) and a shielding member rotatably supported. In the photo interrupter, a light-emitting portion emitting light and a light-receiving portion receiving the light emitted from the light-emitting portion are opposed to each other. The document sensor 36 outputs a sensor signal on the basis of the reception of light in the photo interrupter. When the shielding member is located at a position intercepting the optical path between the light-emitting portion and the light-receiving portion, the light emitted from the light-emitting portion is intercepted by the shielding member and is thus not received by the light-receiving portion. Since the shielding member is detected, the document sensor 36 is in the OFF state. When a document is placed on the document tray 22, the document comes in contact with the shielding member and the shielding member rotates. Accordingly, the shielding member departs from the position intercepting the optical path of the photo interrupter. As a result, the light emitted from the light-emitting portion is received by the light-receiving portion. That is, the document sensor 36 is changed to the ON state. In this way, since the state of the document sensor 36 is changed by placing a document on the document tray 22, the controller 55 can determine the existence of a document on the document tray 22 on the basis of the sensor signal output from the sensor input circuit 129.

The process of setting the reading position is performed at a predetermined time such as when the device is turned on or when a user performs a predetermined input operation. The process of setting the reading position may be performed when a predetermined time passes after the previous process of setting the reading position or when the device is turned on in a predetermined time. FIGS. 7 to 10 are flowcharts illustrating a process flow of the process of setting a reading position at the time of turning on the scanner 10. The processes of the scanner 10 described with reference to the flowcharts are performed in accordance with commands issued from the controller 55 on the basis of the control programs stored in the ROM 57.

The controller 55 determines whether or not the scanner 10 is turned on (S1), on the basis whether a user has performed a predetermined operation input through the operation panel 13. When the controller 55 determines that the scanner is not turned on (NO in S1), the controller is in a waiting state. When the controller 55 determines that the scanner 10 is turned on (YES in S1), the controller determines whether the reading positions of the modes are stored (S2). Specifically, the controller 55 determines whether or not the first position 31, the second position 32, and the third position 33 are stored in the EEPROM 59. When the controller 55 determines that all the reading positions are stored (YES in S2), the process is ended.

When the controller 55 determines that any one of the first position 31, the second position 32, and the third position 33 is not stored (NO in S2), the controller determines whether or not the first position 31 is stored (S3). When the controller 55 determines that the first position 31 is not stored in the EEPROM 59 (NO in S3), the controller generates a notice of a request for placing the first test document 98 (S4). For example, the controller 55 displays a message such as "Please set a first test document on a document tray" on the operation panel 13.

Figure 11:
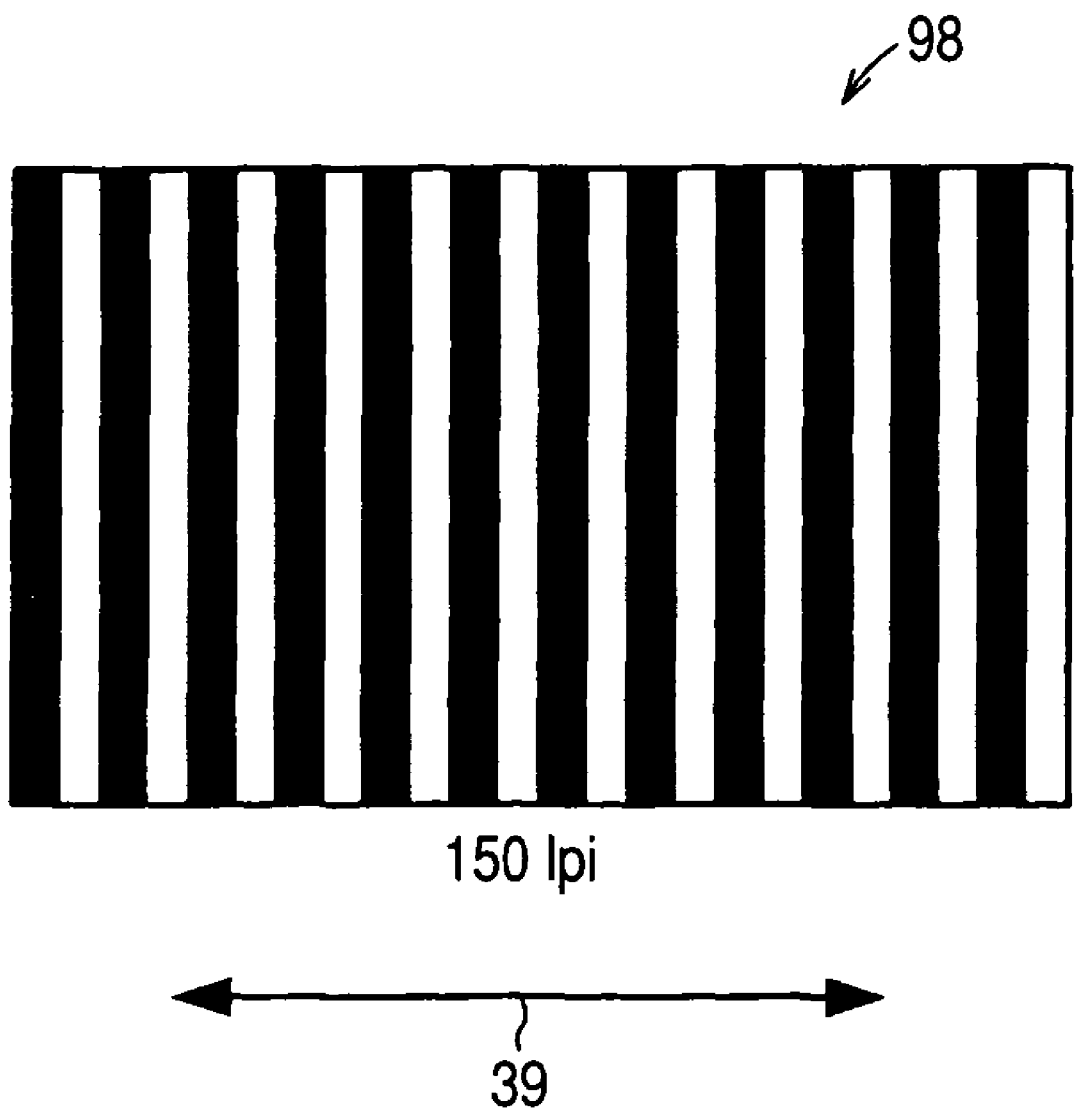
FIG. 11 is a diagram schematically illustrating an example of a first test document.
Figure 12A:
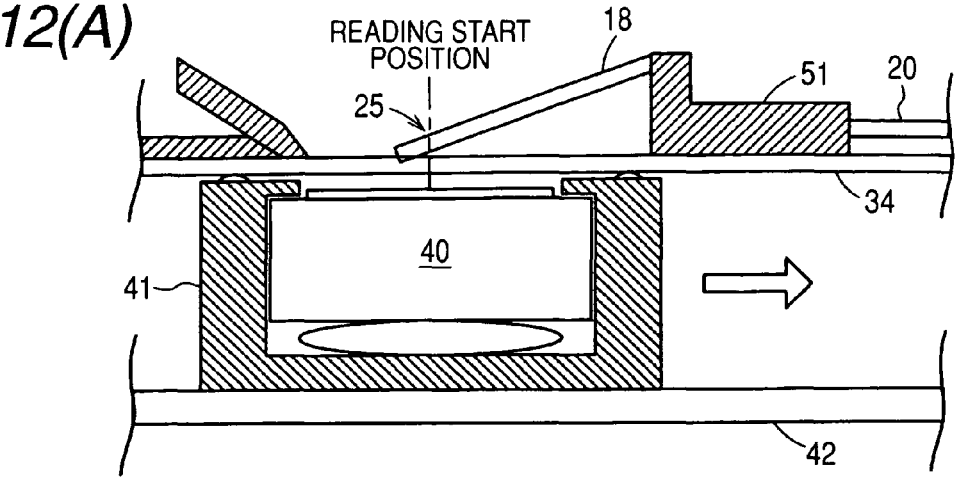
FIGS. 12A to 12C are cross-sectional views schematically illustrating a state where the reading position of the line sensor is changed.
Figure 12B:
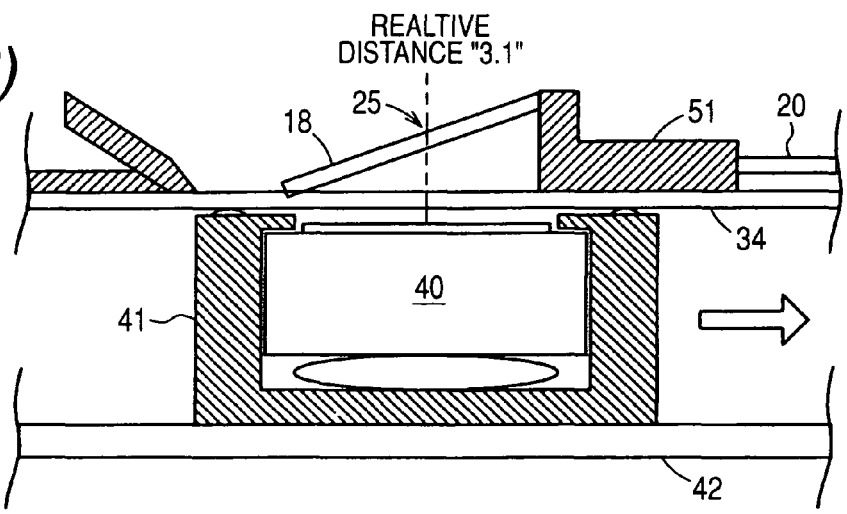
Figure 12C:
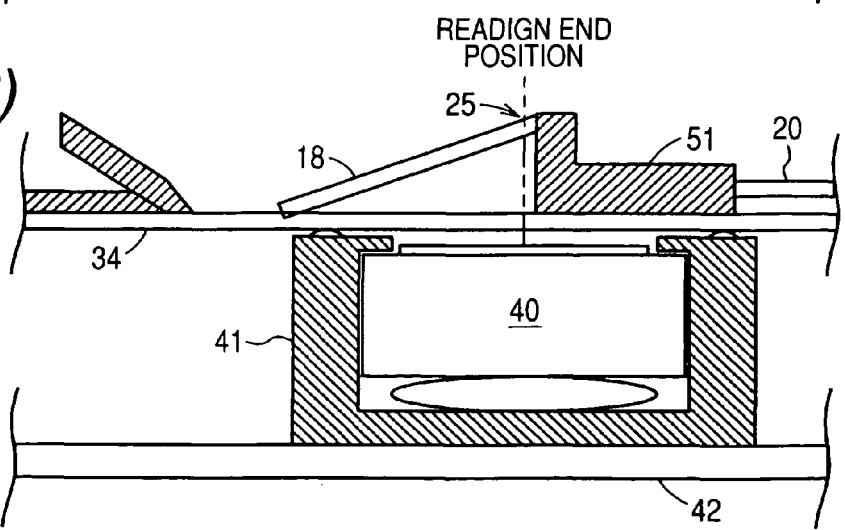

FIG. 11 is a diagram schematically illustrating an example of a first test document 98. FIGS. 12A to 12C are cross-sectional views schematically illustrating a state where the reading position of the line sensor 40 is changed.

As shown in FIG. 11, the first test document 98 has white and black stripes (an example of a predetermined pattern) which are recorded at a pitch of 150 lpi (line per inch). The first test document 98 is placed on the document tray 22 so that the arrangement direction of the pattern (the lateral direction in FIG. 11) is equal to the depth direction (direction indicated by the arrow 39) of the scanner 10. The pitch of the white and black pattern is not limited to 150 lpi, but may be properly changed depending on the performance of the line sensor 40.

The controller 55 determines whether or not the first test document 98 is placed on the document tray 22 (S5), on the basis of the sensor signal output from the document sensor 36 (see FIG. 4). When the controller 55 determines that the first test document 98 is not placed on the document tray 22 (NO in S5), the process of step S4 is performed successively. When the controller 55 determines that the first test document 98 is placed on the document tray 22 (YES in S5), the controller controls the CR motor 65 (see FIG. 4) to allow the line sensor 40 to move to a reading start position (S6). The reading start position is the left end of a readable range (see FIG. 2) of the line sensor 40 on the first glass 18 (see FIG. 12A). The controller controls the motor 72 (see FIG. 4) to convey the first test document 98 along the conveying passage 12 by a predetermined distance. Accordingly, the white and black pattern recorded on the first test document 98 is located above the first glass 18. Then, the controller 55 controls the line sensor 40 to read the first test document 98 through the first glass 18 (S7). In the process of step S7, an image of the first test document 98 is read by one line or several lines. The controller 55 calculates the MTF value on the basis of the image signal of the first test document 98 read in the process of step S7 and Formula 3 (S8).

$$MTF = \frac{(D\max - D\min)/(D\max + D\min)}{(I\max - I\min)/(I\max + I\min)} \qquad \text{[Formula 3]}$$

In Formula 3, Imax denotes the maximum concentration of an input image. In other words, Imax denotes a theoretical value of the maximum concentration of the image recorded on the first test document 98. Imin denotes the minimum concentration of the input image. In other words, Imin denotes a theoretical value of the minimum concentration of the image recorded on the first test document 98. Dmax denotes the maximum concentration of an output image. Dmin denotes the minimum concentration of the output image.

The controller 55 determines whether or not the first set number of MTF values (6 values in this embodiment) have been obtained (S9), subsequently to step S8. When the controller 55 determines that 6 MTF values have not been obtained (NO in S9), the controller controls the CR motor 65 to allow the line sensor 40 to move to a reading end position (see FIGS. 12A to 12C) by a first distance (S10). By performing the process of step S10, the reading position of the line sensor 40 is changed. In other words, the first relative distance is changed. The downstream portion of the reading surface 25 of the first glass 18 in the document conveying direction is more apart from the motion plane of the line sensor 40 than the upstream portion. Accordingly, the first relative distance increases with the movement of the line sensor 40. The reading end position is the right end of the readable range (see FIG. 2) of the line sensor 40 on the first glass 18 (see FIG. 12C).

After the reading position of the line sensor 40 is changed in the process of step S10, the processes of steps S7 and S8 are performed in the state where the line sensor 40 is located at the reading position. The controller 55 controls the line sensor 40 to perform the operation of reading the first test document 98 through the first glass 18 at the positions (6 positions in this embodiment) different in the first relative distance from each other, by sequentially repeating the processes of steps S7, S8, and S10. The controller 55 calculates the MTF values at the 6 positions on the basis of the image signal of the first test document 98 obtained in this operation.

Figure 13A:
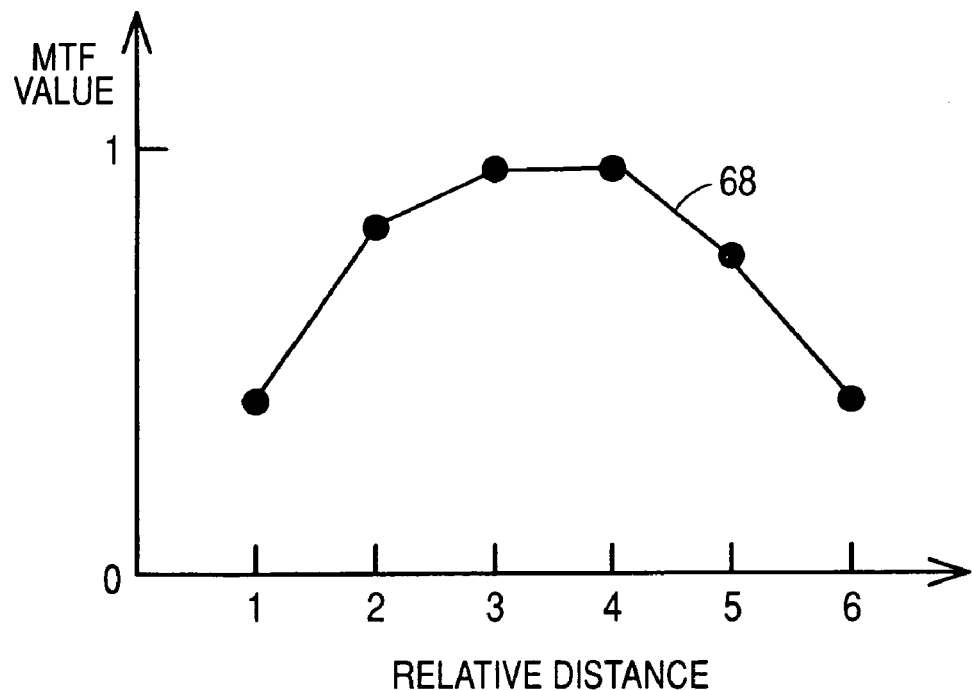
FIGS. 13A and 13B are diagrams illustrating an MTF characteristic obtained by reading the first test document.
Figure 13B:
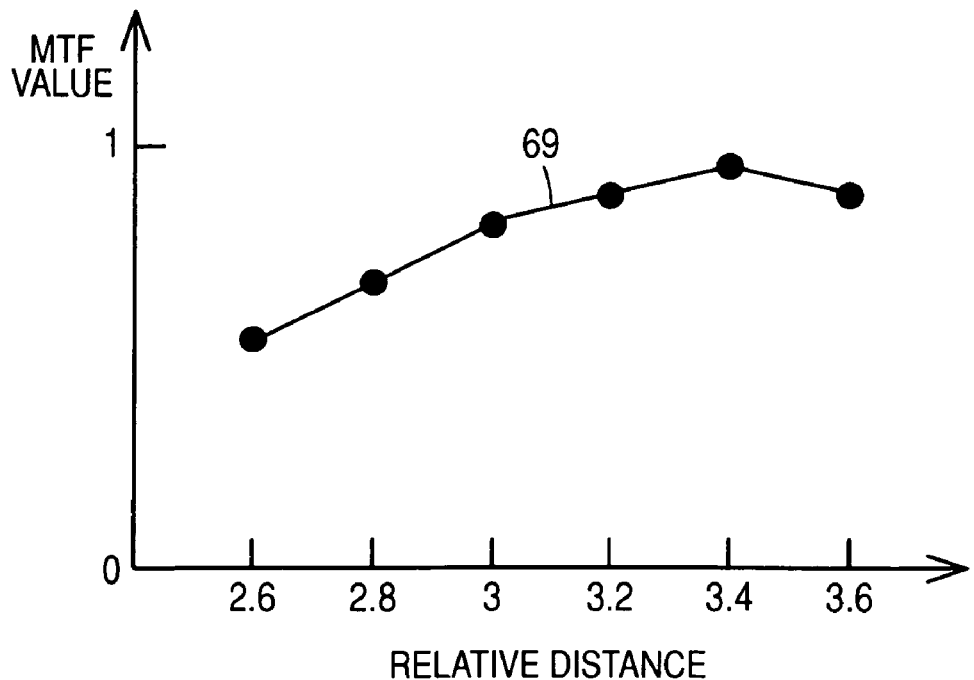

FIGS. 13A and 13B are diagrams illustrating an MTF characteristic obtained by reading the first test document 98.

In FIG. 13A, the horizontal axis represents the relative distance between the line sensor 40 and the reading surface 25 for the first test document 98 on the first glass 18, which is changed by driving the CR motor 65 to move the line sensor 40, that is, the first relative distance. The vertical axis represents the MTF value. In FIG. 13A, the MTF values corresponding to the 6 reading positions different in the first relative distance from each other are shown. "1" of the horizontal axis corresponds to the first relative distance between the line sensor 40 and the first test document 98 in a state where the line sensor 40 is located at the reading start position (see FIG. 12A). "6" of the horizontal axis corresponds to the first relative distance between the line sensor 40 and the first test document 98 in a state where the line sensor 40 is located at the reading end position (see FIG. 12C). As shown in FIG. 13A, the MTF value of the image signal obtained in a state where the line sensor 40 is located at the reading position at which the first relative distance corresponds to "3.1" of the horizontal axis in the MTF curve 68 (see FIG. 12B) is the largest.

In this embodiment, the first distance is set so that the reading position of the line sensor 40 is changed by 6 steps between the reading start position and the reading end position so as to obtain the 6 MTF values. The first distance is set on the basis of a distance from the reading start position to the reading end position and the first set number. The number of obtained MTF values is not limited to 6, but 10 MTF values may be obtained by changing the first distance.

When the controller 55 determines that the 6 MTF values have been obtained (YES in S9), the controller decides as a temporary reading position the reading position at which the MTF value is the maximum (S11). Specifically, the controller 55 calculates the MTF curve 68 (see FIG. 13A) from the 6 MTF values calculated by repeating the processes of steps S8 to S10. Since the method of calculating the MTF curve 68 from the MTF values is well known, its description will be omitted. The controller 55 decides as the temporary reading position the position of the line sensor 40 at which the MTF value is the maximum in the MTF curve 68. Here, the MTF value corresponding to the first relative distance of "3.1" in the horizontal axis in the MTF characteristic shown in FIG. 13A is the maximum. Accordingly, the controller 55 decides as the temporary reading position the reading position (see FIG. 12B) of the line sensor 40 at which the first relative distance is indicated by "3.1" in the horizontal axis. The temporary reading position may be decided without calculating the MTF curve 68. That is, the controller 55 may select the maximum value from the 6 MTF values and decides the reading position of the line sensor 40 corresponding to the MTF value as the temporary reading position. The temporary reading position is temporarily stored in a predetermined area of the RAM 58.

Figure 8:
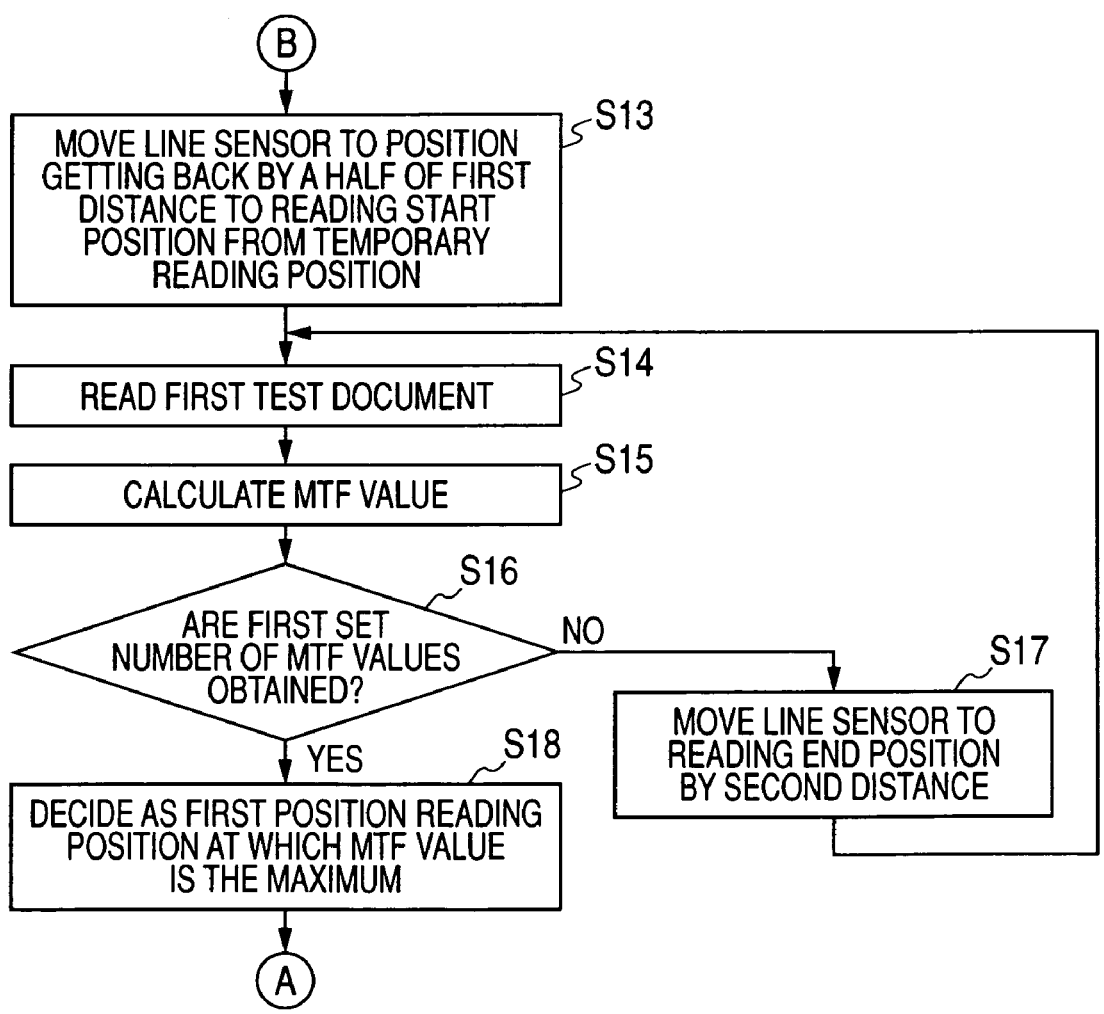
FIG. 8 is a flowchart illustrating a process flow of a reading position setting process performed at the time of turning on the scanner.
Figure 9:
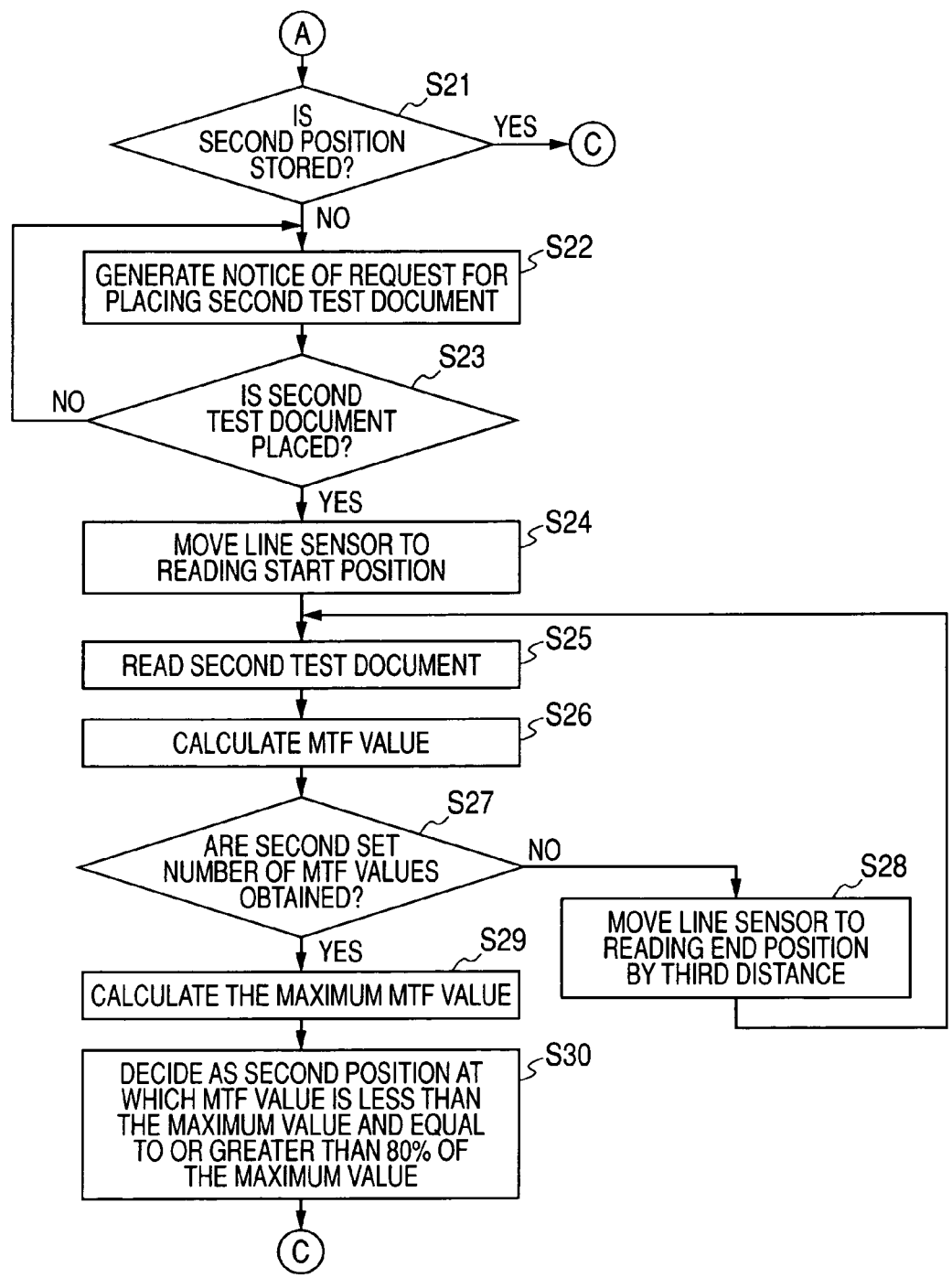
FIG. 9 is a flowchart illustrating a process flow of a reading position setting process performed at the time of turning on the scanner.
Figure 10:
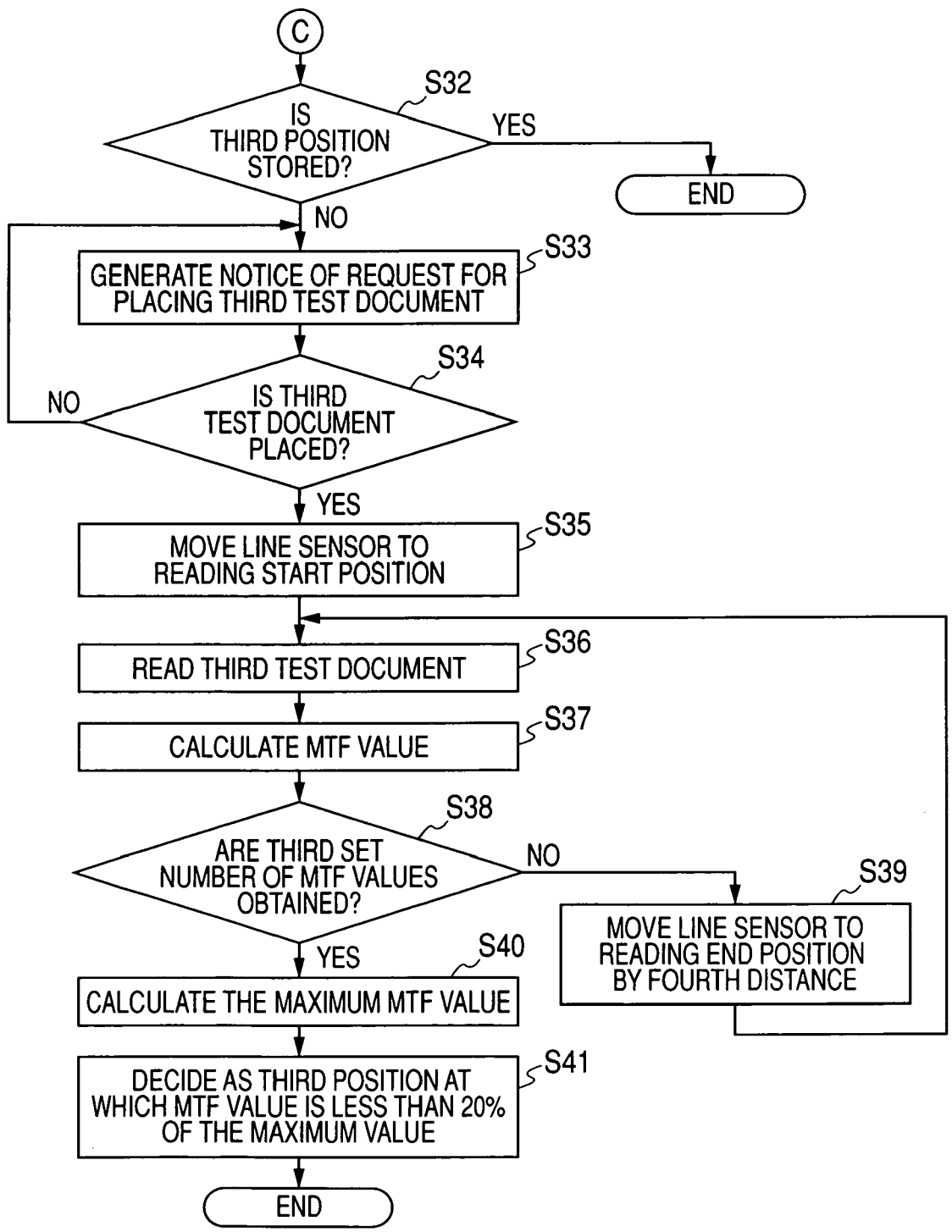
FIG. 10 is a flowchart illustrating a process flow of a reading position setting process performed at the time of turning on the scanner.

As shown in FIG. 8, the controller 55 moves the line sensor 40 to a position going back by a half of the first distance to the reading start position from the temporary reading position (S13) after performing the process of step S11. Specifically, the controller 55 rotationally drives the CR motor 65 in a direction opposite to that of the process of step S10 to move the line sensor 40 located at the reading end position to the position going back by the half. The controller 55 reads the first test document 98 (S14) in the same way as the process of step S7. The controller 55 calculates the MTF value in the same way as the process of step S8 on the basis of the image signal of the first test document 98 read again in the process of step S14 (S15).

The controller 55 determines whether or not the first set number (6 in this case) of MTF values have been obtained (S16). The process of step S16 is performed in the same way as the process of step S9. When the controller 55 determines that the 6 MTF values have not been obtained (NO in S16), the controller controls the CR motor 65 to move the line sensor 40 to the reading end position by a second distance (S17). The second distance is set to about 20% of the first distance in this embodiment. Accordingly, by performing the process of step S17, the reading position of the line sensor 40 is changed more finely in comparison with the process of step S10.

After the reading position of the line sensor 40 is changed in the process of step S17, the processes of steps S14 and S15 are performed in a state where the line sensor 40 is located at the reading position. The controller 55 controls the line sensor 40 to perform the operation of reading the first test document 98 through the first glass 18 at plural positions (6 positions in this case) which are different from each other in the first relative distance and which are in the front or back of the temporary reading position, by repeating the processes of steps S14, S15, and S17. Then, the controller 55 calculates the MTF value at each of the 6 positions on the basis of the image signal of the first test document 98 obtained in this operation.

In FIG. 13B, the horizontal axis represents the first relative distance between the line sensor 40 and the first test document 98, which is changed by moving the line sensor 40 to the front or back of the temporary reading position of "3.1". The vertical axis represents the MTF value. In FIG. 13B, the MTF values corresponding to the 6 reading positions in the front or back of the temporary reading position different from each other in the first relative distance.

When the controller 55 determines that the 6 MTF values have been obtained (YES in S16), the controller decides as the first position 31 the reading position at which the MTF value is the maximum (S18). Specifically, the controller 55 calculates the MTF curve 69 (see FIG. 13B) from the 6 MTF values calculated by repeating the processes of steps S14 to S17. The controller 55 decides as the first position 31 the position of the line sensor 40 at which the MTF value is the maximum in the MTF curve 69. Here, the MTF value corresponding to the first relative distance of "3.4" in the horizontal axis in the MTF characteristic shown in FIG. 13B. Accordingly, the controller 55 decides as the first position 31 the reading position (see FIG. 6A) of the line sensor 40 at which the first relative distance of "3.4" in the horizontal axis is D1 (see FIG. 6A). The first position 31 is information indicating the reading position for the normal mode. The first position 31 is stored in the EEPROM 59. Accordingly, when the reading mode is set to the normal mode, the line sensor 40 is located at the reading position corresponding to the first position 31 by the CR motor 65 at the time of reading the document through the first glass 18.

When the controller 55 determines that the first position 31 is stored in the EEPROM 59 (YES in S3) or performs the process of step S18, the controller determines whether or not the second position 32 is stored in the EEPROM 59 (S21). When the controller 55 determines that the second position 32 is not stored in the EEPROM 59 (NO in S21), the controller generates a notice of a request for placing the second test document 99 (S22). For example, the controller 55 displays a message such as "Please the second test document on the document tray" on the operation panel 13.

Figure 14:
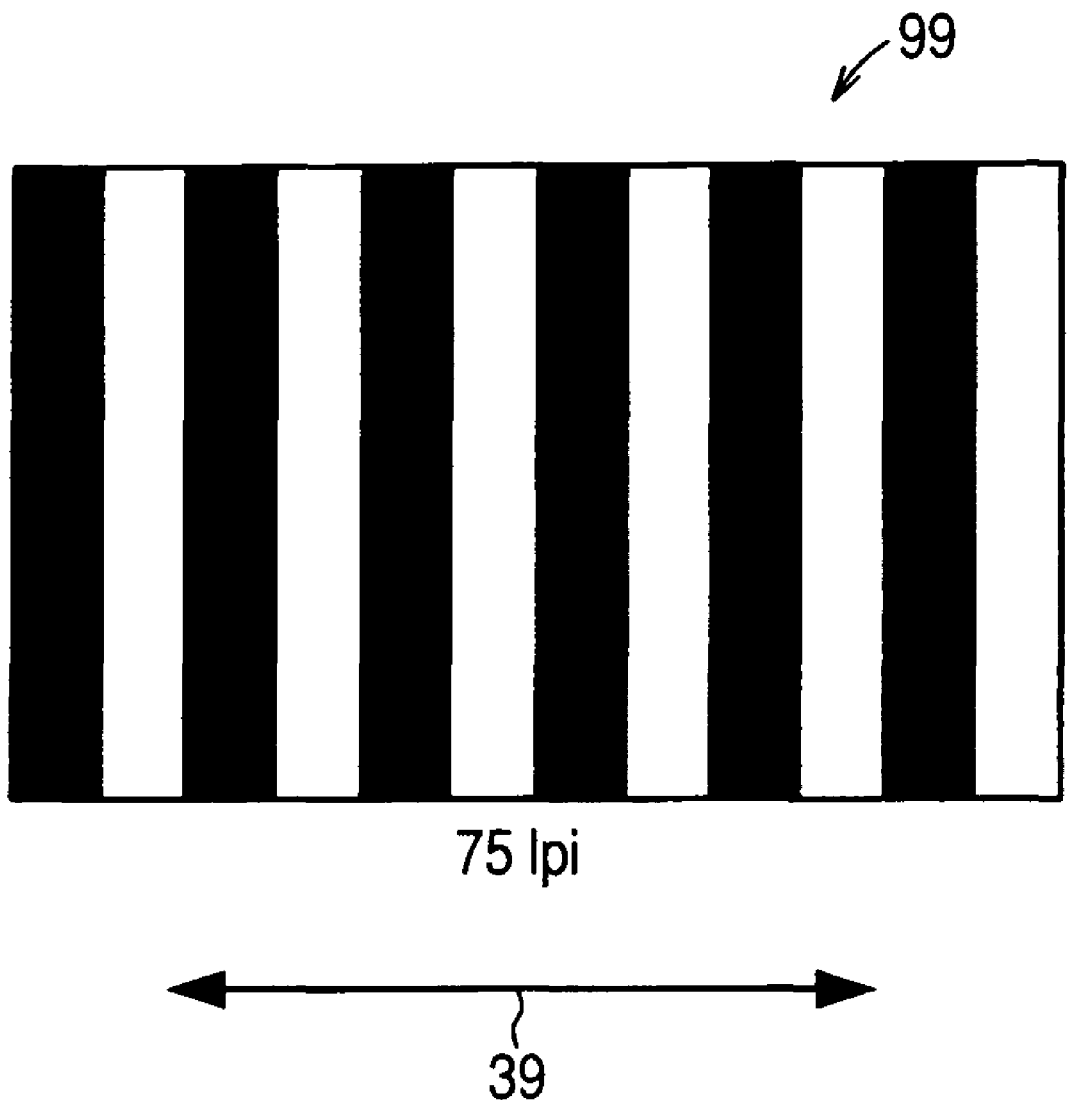
FIG. 14 is a diagram schematically illustrating an example of a second test document.

FIG. 14 is a diagram schematically illustrating an example of the second test document 99.

As shown in FIG. 14, the second test document 99 has white and black stripes recorded thereon at 75 lpi. The second test document 99 is placed on the document tray 22 so that the arrangement direction (left-right direction in FIG. 14) of the pattern is equal to the depth direction (direction indicated by the arrow 39) of the scanner 10. The pitch of the black and white stripe pattern is not limited to the 75 lpi, but may be properly changed depending on the performance of the line sensor 40.

The controller 55 determines whether or not the second test document 99 is placed on the document tray 22, on the basis of the sensor signal output from the document sensor 36 (see FIG. 4) (S23). When the controller 55 determines that the second test document 99 is not placed on the document tray 22 (NO in S23), the process of step S22 is performed continuously. When the controller 55 determines that the second test document 99 is placed on the document tray 22 (YES in S23), the controller moves the line sensor 40 to the reading start position (S24), similarly to the process of step S6. The controller 55 controls the motor 72 to convey the second test document 99 along the conveying passage 12 by a predetermined distance. Accordingly, the black and white pattern recorded on the second test document 99 is disposed above the first glass 18. The controller 55 controls the line sensor 40 to read the second test document 99 through the first glass 18 (S25). The controller 55 calculates the MTF values on the basis of the image signal of the second test document 99 read in the process of step S25 and Formula 3 (S26).

The controller 55 determines whether or not a second set number (11 in this embodiment) of MTF values have been obtained (S27). When the controller 55 determines that the 11 MTF values have not been obtained (NO in S27), the controller controls the CR motor 65 to move the line sensor 40 to the reading end position (see FIG. 12C) by a third distance (S28). Accordingly, the first relative distance between the line sensor 40 and the second test document 99 is changed. The third distance is a distance from the reading start position to the reading end position and is also a distance set on the basis of the second set number. Therefore, the third distance is changed, for example, with the change of the second set number.

After the reading position of the line sensor 40 is changed in the process of step S28, the processes of steps S25 and S26 are performed in a state where the line sensor 40 is located at the reading position. The controller 55 controls the line sensor 40 to perform the operation of reading the second test document 99 through the first glass 18 at the plural positions (11 positions in this case) different in the first relative distance from each other, by repeating the processes of steps S25, S26, and S28. The controller 55 calculates the MTF value at each of the 11 positions on the basis of the image signal of the second test document 99 obtained in this operation.

Figure 15:
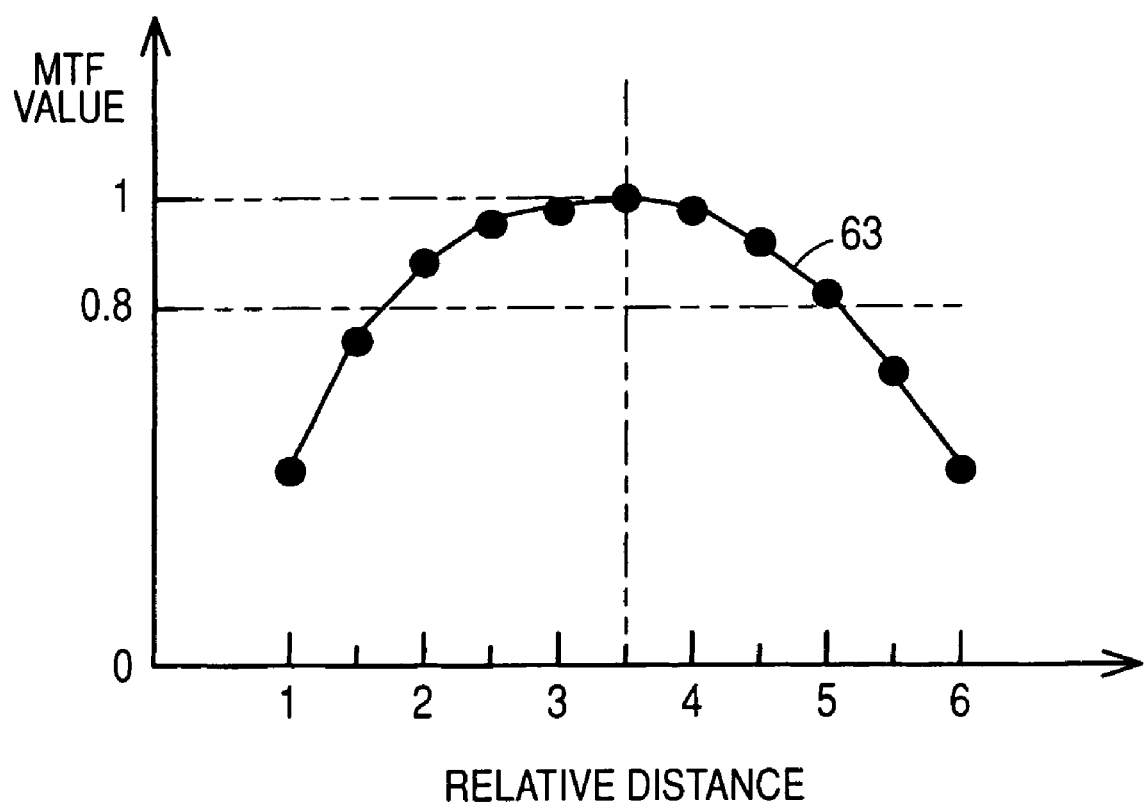
FIG. 15 is a diagram illustrating an MTF characteristic obtained by reading the second test document.

FIG. 15 is a diagram illustrating the MTF characteristic obtained by reading the second test document 99.

In FIG. 15, the horizontal axis represents the relative distance between the line sensor 40 and the reading surface 25 for the second test document 99 on the first glass 18, which is changed by driving the CR motor 65 to move the line sensor 40, that is, the first relative distance. The vertical axis represents the MTF value. In FIG. 15, the MTF values corresponding to the 11 reading positions different in the first relative distance from each other are shown.

When the controller 55 determines that the 11 MTF values have been obtained (YES in S27), the controller obtains the maximum value of the MTF values (S29). Specifically, the controller 55 obtains an MTF curve 63 (see FIG. 15) from the 11 MTF values calculated by repeating the processes of steps S25 to S28. Then, the controller 55 determines the peak of the MTF curve 63 to obtain the maximum value of the MTF values. Here, as shown in FIG. 15, The MTF value corresponding to the first relative distance of "3.5" in the horizontal axis is the maximum value.

The controller 55 decides as the second position 32 a position at which the MTF value is less than the maximum value obtained in the process of step S29 and equal to or greater than 80% of the maximum value (which is an example of a predetermined threshold value) (S30). Specifically, the controller 55 calculates the MTF value which is 80% of the maximum value obtained in the process of step S29. For example, when the maximum value is 1, the MTF value is 0.8. The controller 55 determines the position of the line sensor 40 corresponding to the calculated MTF value (0.8 in this case). As can be clearly seen from FIG. 15, two positions of the line sensor 40 at which the MTF value is 0.8 exist on both sides of the maximum MTF value. In other words, two MTF values having the same magnitude are obtained. On this condition, the controller 55 decides as the second position 32 the reading position (see FIG. 6B) at which the first relative distance corresponding to the MTF value is the smaller. Here, when the reading position at which the first relative distance is the larger is set as the second position 32 and the document is floated from the first glass 18, the intensity of light applied to the document from the light source of the line sensor 40 is greatly reduced. By deciding as the second position 32 the reading position at which the first relative distance is the smaller, it is possible to prevent the read image of the document from being extremely unclear when the document is floated from the first glass 18. The second position 32 is a reading position for the moire reducing mode. The second position 32 is stored in the EEPROM 59. Accordingly, when the reading mode is set to the moire reducing mode, the line sensor 40 is located at the reading position corresponding to the second position 32 by the CR motor 65 at the time of reading the document through the first glass 18. As shown in FIG. 6B, the line sensor 40 is located at the reading position at which the first relative distance is D2. Here, 80% of the maximum MTF value is only an example of the predetermined threshold value and may be properly changed depending on the degree of moire or the like.

When the controller 55 determines that the second position is stored (YES in S21) or when the controller performs the process of step S30, the controller determines whether or not the third position 33 (see FIG. 4) is stored in the EEPROM 59

(S32). When the controller 55 determines that the third position 33 is stored (YES in S32), the process is ended. When the controller 55 determines that the third position 33 is not stored (NO in S32), the controller generates a notice of a request for placing a third test document (not shown) (S33). For example, the controller 55 displays a message such as "please set the third test document on the document tray" on the operation panel 13. The third test document has a black and white stripe pattern recorded thereon, for example, at 50 lpi.

The controller 55 determines whether or not the third test document is placed on the document tray 22 (S34). The process of step S34 is performed in the same way as the process of step S5. When the controller 55 determines that the third test document is not placed on the document tray 22 (NO in S34), the process of step S33 is performed continuously. When the controller 55 determines that the third test document is placed on the document tray 22 (YES in S34), the controller moves the line sensor 40 to the reading start position (S35), similarly to the process of step S6. The controller 55 controls the motor 72 to convey the third test document along the conveying passage 12 by a predetermined distance. Accordingly, the black and white pattern recorded on the third test document is located above the first glass 18. Then, the controller 55 controls the line sensor 40 to read the third test document through the first glass 18 (S36). The controller 55 calculates the MTF value on the basis of the image signal of the third test document read in the process of step S36 and Formula 3 (S37).

The controller 55 determines whether or not a third set number (for example, 8) of MTF values have been obtained (S38). When the controller 55 determines that 8 MTF values have not been obtained (NO in S38), the controller controls the CR motor 65 to move the line sensor 40 to the reading end position (see FIG. 12C) by a fourth distance (S39). Accordingly, the first relative distance between the line sensor 40 and the reading surface 25 for the third test document on the first glass 18 is changed. The fourth distance is set on the basis of the distance from the reading start position to the reading end position and the third set number.

After the reading position of the line sensor 40 is changed in the process of step S39, the processes of steps S36 and S37 are performed in a state where the line sensor 40 is located at the reading position. The controller 55 controls the line sensor 40 to perform the operation of reading the third test document through the first glass 18 at plural positions (8 positions in this case) different from each other in the first relative distance, by repeating the processes of steps S36, S37, and S39. Then, the controller 55 calculates the MTF value at each of the 8 positions on the basis of the image signal of the third test document obtained in this operation.

When the controller 55 determines that the 8 MTF values have been obtained (YES in S38), the controller obtains the maximum value of the MTF values (S40). The process of step S40 is performed in the same way as the process of step S29. That is, the process of step S40 is performed by calculating the MTF curve from the 8 MTF values obtained by repeating the processes of steps S36 to S39 and determining the MTF value corresponding to the pitch.

The controller 55 decides as the third position 33 the position at which the MTF value is less than 20% of the maximum value obtained in the process of step S40 (S41). Specifically, the controller 55 calculates the MTF value which is 20% of the maximum value obtained in the process of step S40. For example, when the maximum value is 1, the MTF value is 0.2. The controller 55 determines the position of the line sensor 40 corresponding to the calculated MTF value (0.2 in this case).

The MTF curve resulting from the MTF values calculated in the process of step S37 is a curve a peak at the center thereof, similarly to the MTF curve 68 (see FIG. 13A) or the MTF curve 63 (see FIG. 15). Accordingly, two MTF values having the same magnitude are obtained from the MTF curve. The controller 55 decides as the third position 33 the reading position (see FIG. 6C) at which the first relative distance is the smaller. The third position 33 is a reading position for the blur mode. The third position 33 is stored in the EEPROM 59. Accordingly, when the reading mode is set to the blur mode, the line sensor 40 is located at the reading position corresponding to the third position 33 by the CR motor 65 at the time of reading a blurred area of a document through the first glass 18. As shown in FIG. 6C, the line sensor 40 is located at the reading position at which the first relative distance is D3. In this embodiment, when the reading mode is set to the blur mode, the image of an extra-dim area of the document is read in a state where the line sensor 40 is located at the reading position corresponding to the second position 32. That is, in the blur mode, the document conveyed by the ADF 28 is read while the reading position of the line sensor 40 is changed in the course of reading the document. The reading of a document in the blur mode will be described in detail later.

In this way, the first test document 98 (see FIG. 11) is read by the line sensor 40 through the first glass 18. The line sensor 40 moves relative to the first glass 18 by the CR motor 65. The position of the line sensor 40 relative to the first glass 18 is changed and the first test document 98 is read by the line sensor 40. Accordingly, the image signal of the first test document 98 is obtained every position at which the line sensor 40 is located. The MTF value is calculated every position of the line sensor 40 on the basis of the image signals (see FIGS. 13A and 13B). The first position 31 which is the information indicating the reading position for the normal mode (see FIG. 6A) is decided on the basis of the MTF values. Similarly, the second position 32 which is the information indicating the reading position (see FIG. 6B) for the moire reducing mode is decided by the use of the second test document 99 (see FIG. 14). The third position 33 is decided which is the information indicating the reading position (see FIG. 6C) for the blur mode is decided by the use of the third test document.

In this way, the controller 55 decides the reading positions at which the line sensor 40 is located by the CR motor 65 in the normal mode, the moire reducing mode, and the blur mode on the basis of the MTF values calculated while changing the reading position.

The first to third positions 31 to 33 may be decided using a sheet of test document having three patterns recorded thereon for deciding the first to third positions 31 to 33, instead of three sheets of the first test document 98, the second test document 99, and the third test document. In this case, a test document is used in which three patterns are arranged in the depth direction (direction indicated by the arrow 39) of the scanner 10. The controller 55 individually reads the images of the patterns while changing the reading range in the main scanning direction of the test document. Then, the controller 55 determines the first to third positions 31 to 33 on the basis of the obtained images. In this case, a user's labor for placing the test documents on the document tray 22 is reduced. A test document in which three patterns are arranged in the document conveying direction may be used. In this case, by conveying the test document, the images of the patterns can be individually read by changing the pattern located on the first glass 18.

Although it has been described in this embodiment that three patterns are used to decide the first to third positions 31 to 33, the number of patterns used to decide the reading positions may be 1. For example, without using the second test document 99 and the third test document, the first to third positions 31 to 33 may be decided using only the first test document 98. In this case, the controller 55 decides as the first position 31 the reading position corresponding to the maximum MTF value obtained by reading the pattern of the first test document 98. Then, the controller 55 decides as the second position 32 the reading position corresponding to the MTF value which is 80% of the maximum value and decides as the third position 33 the reading position corresponding to the MTF value which is 50% of the maximum value. That is, the number of patterns used to decide the first to third positions 31 to 33 is arbitrary.

Figure 16:
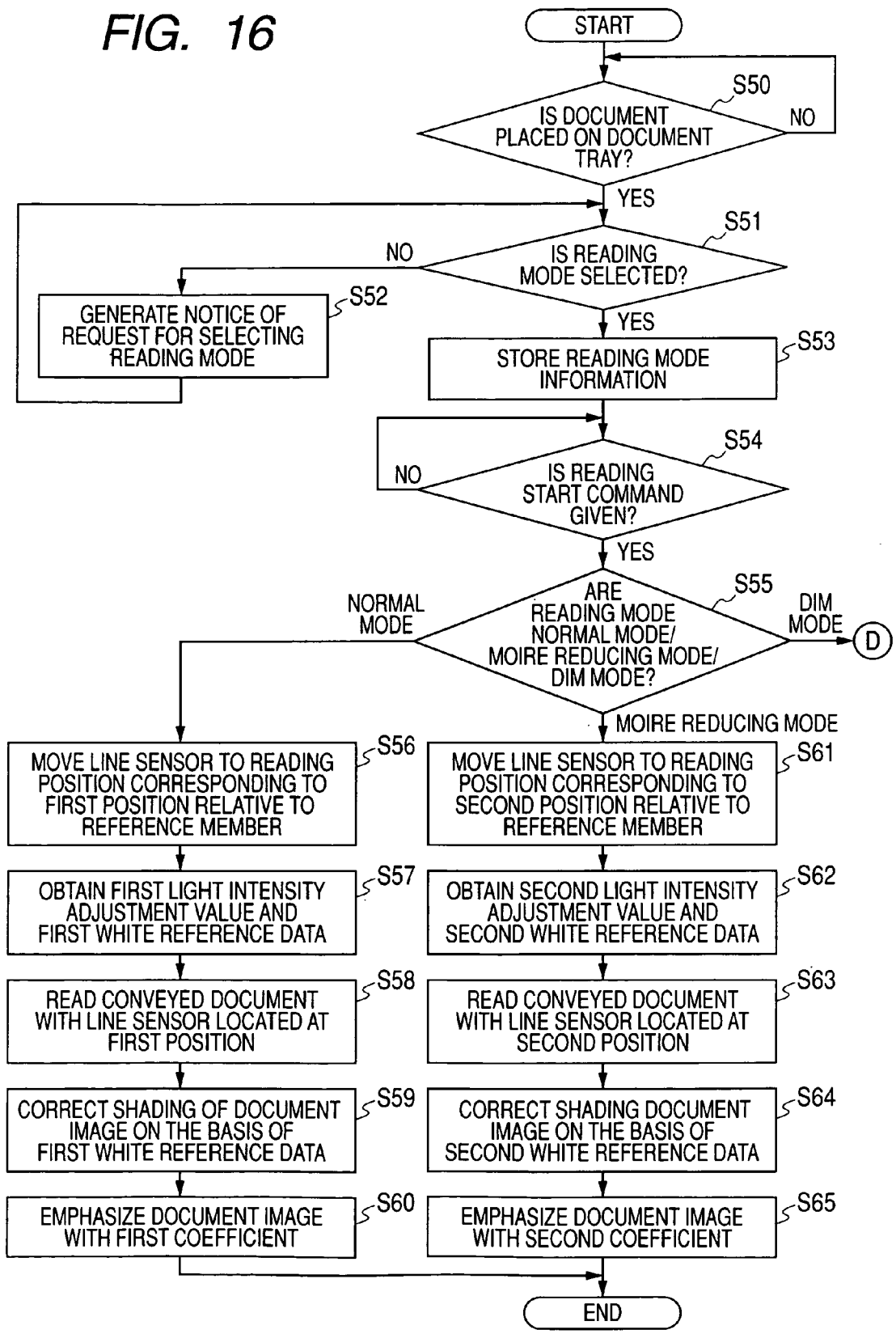
FIG. 16 is a flowchart illustrating a flow of processes performed by the scanner at the time of reading a document conveyed by an ADF.
Figure 17:
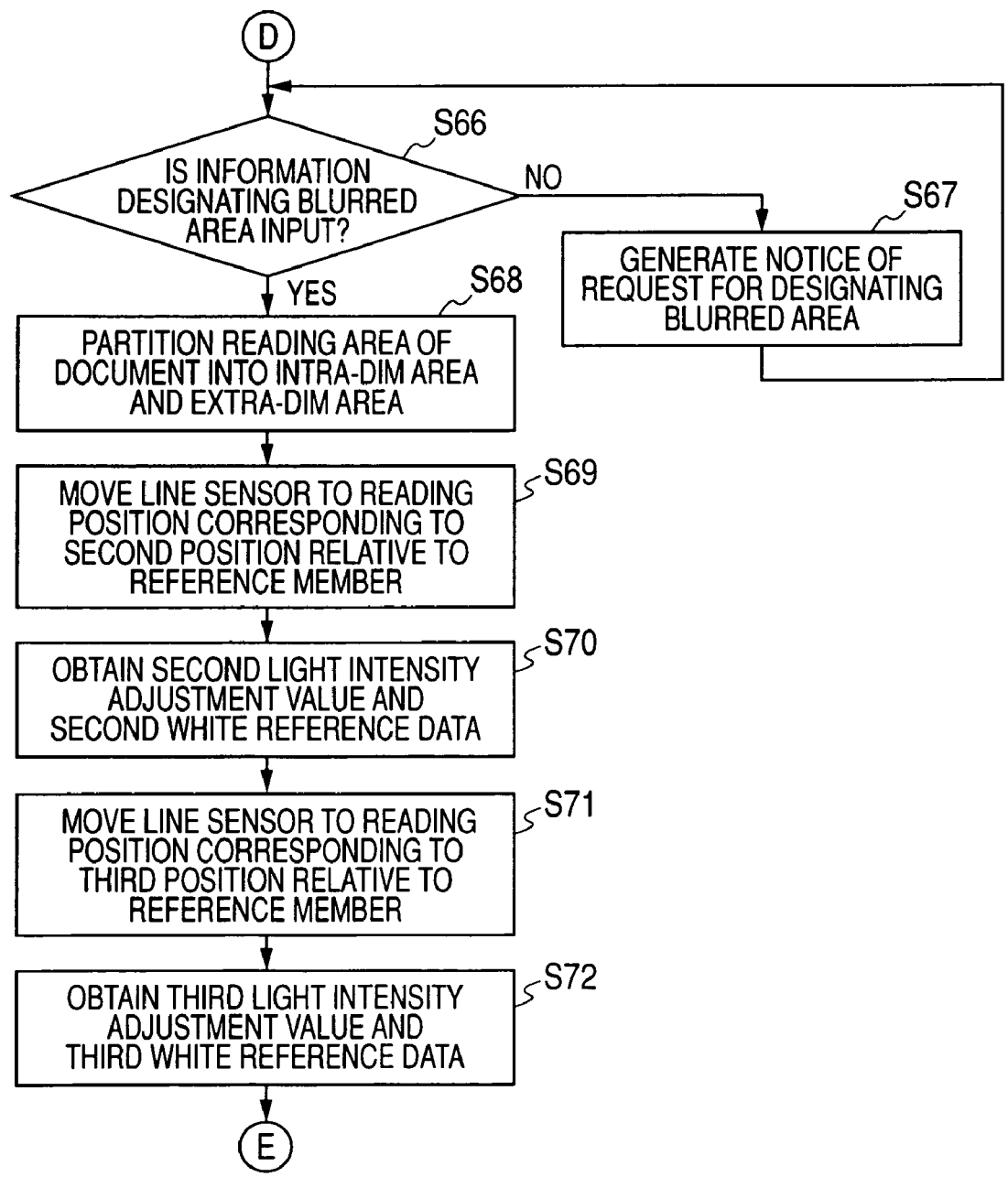
FIG. 17 is a flowchart illustrating a flow of processes performed by the scanner at the time of reading a document conveyed by the ADF.
Figure 18:
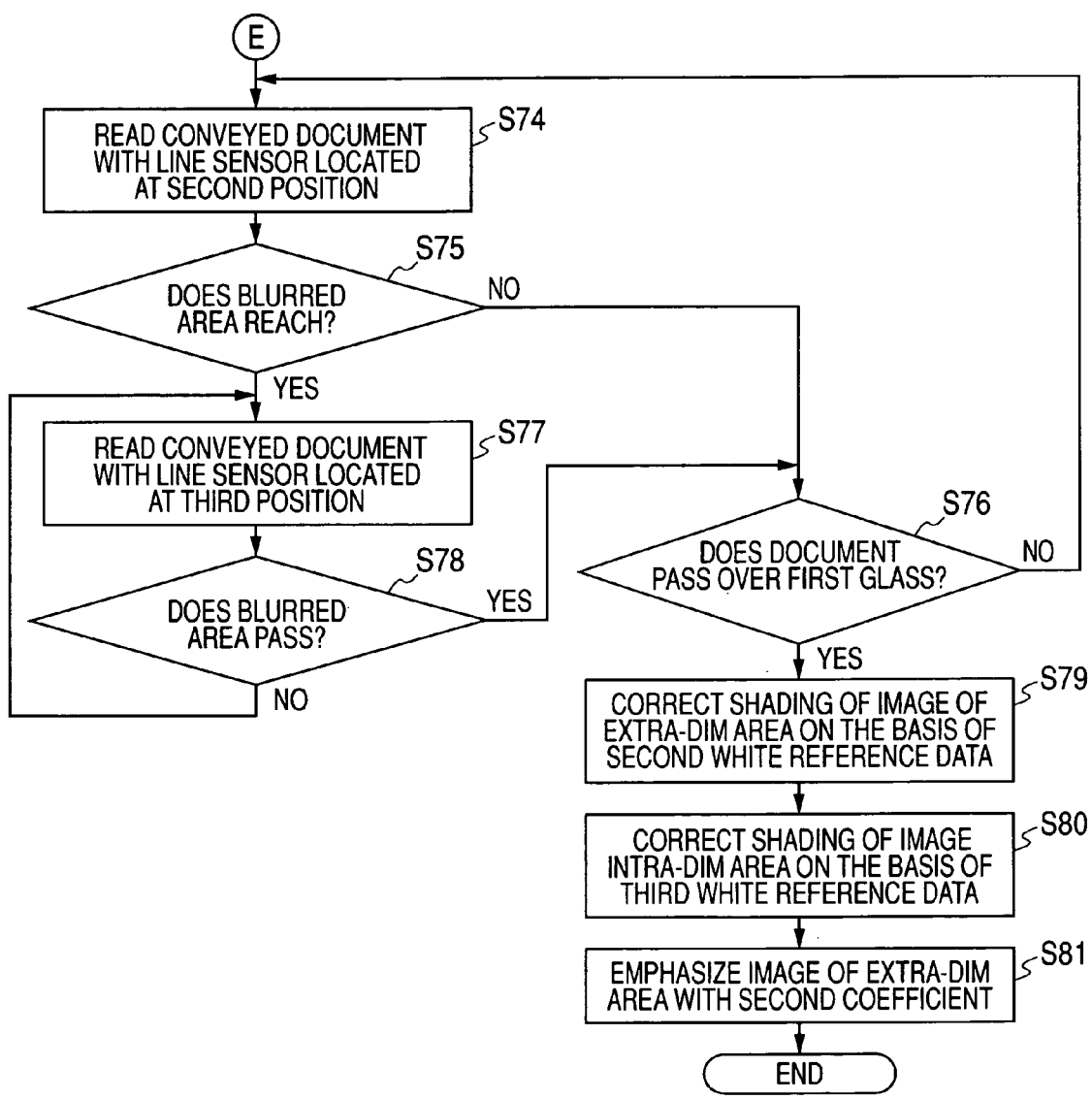
FIG. 18 is a flowchart illustrating a flow of processes performed by the scanner at the time of reading a document conveyed by the ADF.

FIGS. 16 to 18 are flowcharts illustrating a flow of processes performed by the scanner 10 at the time of reading the document conveyed by the ADF 28.

The controller 55 determines whether or not a document is placed on the document tray 22 on the basis of the sensor signal output from the document sensor 36 (S50). When the controller 55 determines that a document is not placed on the document tray 22 (NO in S50), the controller is in the waiting state. When the controller 55 determines that a document is placed on the document tray 22 (YES in S50), the controller determines whether or not the reading mode is selected on by a predetermined operation from the operation panel 13 (S51). When the controller 55 determines that the reading mode is not selected (NO in S51), the controller generates a notice of a request for selecting a reading mode (S52). Specifically, the controller 55 displays a message such as "please select a reading mode" and selectable reading modes (normal mode, moire reducing mode, and blurred mode in this embodiment) on the display panel 13. The process of step S52 is continuously performed until the controller 55 determines that a reading mode is selected in the process of step S51. When the controller 55 determines that a reading mode is selected (YES in S51), the controller stores the information as the reading mode information 24 (see FIG. 4) in the RAM 58 (S53). In this way, the controller 55 receives the selection of the normal mode, the moire reducing mode, or the blur mode and sets any one mode in the RAM 58. The normal mode may be set as a default of the reading mode so that the normal mode is set when it is instructed to start reading a document without selecting a reading mode.

The controller 55 determines whether or not a document reading start command is input on the basis of a predetermined operation input from the operation panel 13 (S54) When the controller 55 determines that the document reading start command is not input (NO in S54), the controller performs again the process of step S54. When the controller 55 determines that the document reading start command is input (YES in S54), the controller determines what of the normal mode, the moire reducing mode, and the blur mode is set as the reading mode on the basis of the reading mode information 24 stored in the RAM 58 (S55).

When the controller 55 determines that the reading mode is set to the normal mode (normal mode in S55), the controller moves the line sensor 40 to the reading position corresponding to the first position 31 relative to the reference member 37 (see FIG. 2) (S56). This reading position is a position at which the relative distance (the second relative distance) between the line senor 40 moving below the reference member 37 by the CR motor 65 and the reading surface 27 of the reference member 37 is substantially equal to the relative distance (the first relative distance) between the line sensor 40 located at the first position 31 and the document reading surface 25 on the first glass 18. For example, by correlating and storing in advance the reading position of the line sensor 40 relative to the first glass 18 and the reading position of the line sensor 40 relative to the reference member 37 with each other, it is possible to allow the first relative distance and the second relative distance to be substantially equal to each other. That is, it is possible to allow the distances to the reference member 37 and the reading surface 25 to be equal to each other. Accordingly, it is possible to prevent a difference in intensity between the light applied to the reading surface 25 on the first glass 18 from the light source of the line sensor 40 and the light applied to the reference member 37 from the light source of the line sensor 40.

The controller 55 obtains the first light intensity adjustment value 101 and the first white reference data 90 (see FIG. 5) (S57). The controller 55 applied light to the reading surface 27 on the reference member 37 with the small intensity at first from the light source of the line sensor 40. Then, the controller 55 gradually increases the intensity of the light source until the output from the light-receiving element of the line sensor 40 reaches a predetermined value, and obtains as the first light intensity adjustment value 101 the intensity when the received light intensity reaches the predetermined value. That is, the first light intensity adjustment value 101 is the light intensity of the light source when the light intensity received by the light-receiving element of the line sensor 40 reaches the predetermined value. Subsequently, the controller 55 applies light to the reading surface 27 of the reference member 37 from the light source of the line sensor 40 with the light intensity of the first light intensity adjustment value 101. Then, the controller 55 converts the reflected light from the reading surface 27 into the electrical signal by the use of the light-receiving element of the line sensor 40, thereby obtaining the first white reference data 90. The first light intensity adjustment value 101 and the first white reference data 90 obtained in the process of step S57 are stored in the RAM 58.

The controller 55 controls the line sensor 40 located at the reading position corresponding to the first position 31 to read the document conveyed by the ADF 28 (S58). Specifically, the controller 55 controls the CR motor 65 to move the line sensor 40 opposed to the reference member 37 to the reading position (see FIG. 6A) corresponding to the first position 31. The controller 55 controls the line sensor 40 to perform the operation of reading the document conveyed over the first glass 18 at the reading position corresponding to the first position 31. Accordingly, an image of a document is read in a state where the line sensor 40 is substantially focused on the document reading surface 25 of the first glass 18. For this reason, it is possible to obtain a clearer image of the document in comparison with a case where the document is read by the line sensor 40 located at a different position. The document image (image signal) read in this way is processed by the AFE circuit 78, the sampling circuit 81, and the darkness correction circuit 82.

The shading correction circuit 83 corrects the shading of the document image processed by the darkness correction circuit 82 on the basis of the first white reference data 90 obtained in the process of step S57 (S59). The filter processing circuit 85 emphasizes the document image of which the shading has been corrected on the basis of the first coefficient 75 stored in the EEPROM 59 (S60). In this way, the filter process circuit 85 emphasizes the document image obtained in the normal mode by the use of the first coefficient 75. The emphasized document image is processed by the resolution conversion circuit 86, the color conversion circuit 87, and binarization circuit 88 and then is stored in a predetermined area of the RAM 58.

When the controller 55 determines that the reading mode is set to the moire reducing mode (moire reducing mode in S55), the controller moves the line sensor 40 to the reading position corresponding to the second position 32 relative to the reference member 37 (see FIG. 2) (S61). The reading position is a position at which the second relative position between the line sensor 40 moved below the reference member 37 by the CR motor 65 and the reading surface 27 of the reference member 37 is substantially equal to the first relative distance between the line sensor 40 located at the reading position corresponding to the second position 32 and the document reading surface 25 of the first glass 18.

The controller 55 obtains the second light intensity adjustment value 102 and the second white reference data 91 (see FIG. 5) (S62). The process of step S62 is performed in the same way as the process of step S57, except that the reading position of the line sensor 40 relative to the reference member 37 is different. The second light intensity adjustment value 102 and the second white reference data 91 obtained in the process of step S62 are stored in the RAM 58.

The controller 55 controls the line sensor 40 located at the reading position corresponding to the second position 32 to read the document conveyed by the ADF 28 (S63). Specifically, the controller 55 controls the CR motor 65 to move the line sensor 40 opposed to the reference member 37 to the reading position (see FIG. 6B) corresponding to the second position 32. The controller 55 controls the line sensor 40 to perform the operation of reading the document conveyed over the first glass 18 at the reading position corresponding to the second position 32. Accordingly, an image of a document is read in a state where the focus of the line sensor 40 is slightly out of the document reading surface 25 of the first glass 18. The document image (image signal) read in this way is processed by the AFE circuit 78, the sampling circuit 81, and the darkness correction circuit 82.

The shading correction circuit 83 corrects the shading of the document image processed by the darkness correction circuit 82 on the basis of the second white reference data 91 obtained in the process of step S62 (S64). The filter processing circuit 85 emphasizes the document image of which the shading has been corrected on the basis of the second coefficient 76 stored in the EEPROM 59 (S65). In this way, the filter process circuit 85 emphasizes the document image obtained in the moire reducing mode by the use of the second coefficient 76. The second coefficient 76 is larger than the first coefficient 75. For this reason, the document image read in the process of step S63 is more emphasized than the document image read in the process of step S58. By reading the document in the moire reducing mode, the moire is suppressed from occurring and the image is prevented from being blurred. The emphasized document image is processed by the resolution conversion circuit 86, the color conversion circuit 87, and binarization circuit 88 and then is stored in a predetermined area of the RAM 58.

When the controller 55 determines that the reading mode is set to the blur mode (dim mode in S55), the controller determines whether or not the information designating the blurred area is input on the basis of a predetermined operation from the operation panel 13 (S66). Here, the blurred area is an area which is read in a blurred state among the reading area of the document conveyed by the ADF 28. When the controller 55 determines that the information designating the blurred area is not input (NO in S66), the controller generates a notice of a request for designating the blurred area (S67). For example, the controller 55 displays a message such as "please designate a blurred area" on the operation panel 13. The process of step S67 is repeated until YES is determined in the process of step S66.

When the controller 55 determines that the information designating the blurred area is input (YES in S66), the controller partitions the reading area of the document into an intra-dim area and an extra-dim area (S68). In this way, the controller 55 partitions the reading area for the line sensor 40 in the document conveyed by the ADF 28 into plural areas (two areas in this case) on the basis of information input from the outside.

The controller 55 moves the line sensor 40 to the reading position corresponding to the second position 32 relative to the reference member 37 (S69). The controller 55 obtains the second light intensity adjustment value 102 and the second white reference data 91 (S70), similarly to the process of step S62. The second light intensity adjustment value 102 and the second white reference data 91 are stored in the RAM 58. The controller 55 moves the line sensor 40 to the reading position corresponding to the third position 33 relative to the reference member 37 (S71). This reading position is a position at which the second relative distance between the line sensor 40 moved below the reference member 37 by the CR motor 65 and the reading surface 27 of the reference member 37 is substantially equal to the first relative distance between the line sensor 40 located at the reading position corresponding to the third position 33 and the document reading surface 25 of the first glass 18. The controller 55 obtains the third light intensity adjustment value 103 and the third white reference data 92 (S72), similarly to the process of step S57. The third light intensity adjustment value 103 and the third white reference data 92 are stored in the RAM 58.

As shown in FIG. 18, the controller 55 controls the line sensor 40 located at the reading position corresponding to the second position 32 to read the document conveyed by the ADF 28 (S74). Specifically, the controller 55 controls the CR motor 65 to move the line sensor 40 opposed to the reference member 37 to the reading position (see FIG. 6B) corresponding to the second position 32. Then, the controller 55 controls the line sensor 40 to perform the operation of reading the document conveyed over the first glass 18 at the reading position corresponding to the second position 32. Accordingly, the document image is read in a state where the focus of the line sensor 40 is slightly out of the document reading surface 25 of the first glass 18.

The controller 55 determines whether or not the blurred area of a document conveyed by the ADF 28 reaches the reading surface 25 (see FIG. 6C) of the first glass 18 (S75). The process of step S75 is performed on the basis of the information on the blurred area partitioned in the process of step S68 and the number of steps of the motor 72 (see FIG. 4) after the conveying of the document is started by the ADF 28. When the controller 55 determines that the blurred area does not reach the reading surface (NO in S75), the controller determines whether or not the document passes over the first glass 18 (S76). When the controller 55 determines that the document does not pass over the first glass 18 (NO in S76), the process of step S74 is performed again.

When the controller 55 determines that the blurred area reaches the reading surface (YES in S75), the controller controls the line sensor 40 located at the reading position (see FIG. 6C) corresponding to the third position 33 to read the document conveyed by the ADF 28 (S77). Specifically, the controller 55 controls the CR motor 65 to move the line sensor 40 located at the second position 32 to the reading position corresponding to the third position 33. The controller 55 controls the line sensor 40 to perform the operation of reading the document conveyed over the first glass 18 at the reading position corresponding to the third position 33. Accordingly, the image of the document is read in a state where the focus of the line sensor 40 is extremely out of the document reading surface 25 of the first glass 18.

In this way, the controller 55 decides the reading position for the blur mode at each of the plural areas (the intra-dim area and the extra-dim area in this embodiment). The controller 55 changes the position of the line sensor 40 at each of the areas (the intra-dim area and the extra-dim area) in the course of reading the document conveyed in the blur mode. Accordingly, the resolution of the line sensor 40 is changed by areas to read the document. As a result, the obtained document image has a blurred image in a partial area.

The controller 55 determines whether or not the blurred area passes the reading surface 25 (see FIG. 6C) of the first glass 18 corresponding to the third position 33 (S78). The process of step S78 is performed on the basis of the information on the blurred area partitioned in the process of step S68 and the number of steps of the motor 72 after the conveying of the document is started by the ADF 28. When the controller 55 determines that the blurred area does not pass the reading surface (NO in S78), the process of step S77 is repeated. When the controller 55 determines that the blurred area passes the reading surface (YES in S78), the process of step S76 is performed. When the controller 55 determines that the document passes over the first glass 18 (YES in S76), the controller determines that the reading of the document is finished.

The document image (image signal) read in the processes of steps S74 and S77 is processed by the AFE circuit 78, the sampling circuit 81, and the darkness correction circuit 82. When the controller 55 determines in step S76 that it is YES, the shading correction circuit 83 corrects the shading of the image of the extra-dim area on the basis of the second white reference data 91 obtained in the process of step S70 (S79). The shading correction circuit 83 corrects the shading of the image of the intra-dim area on the basis of the third white reference data 92 obtained in the process of step S72 (S80).

The filter processing circuit 85 emphasizes the image of the extra-dim area of which the shading is corrected on the basis of the second coefficient 76 (see FIG. 5) stored in the EEPROM 59 (S81). The emphasized images of the intra-dim area and the extra-dim area are processed by the resolution conversion circuit 86, the color conversion circuit 87, and the binarization circuit 88 and then are stored in a predetermined area of the RAM 58.

In the blur mode, the information designating the blurred area is input from the operation panel 13. The reading area of the document conveyed by the ADF 28 is partitioned into the intra-dim area and the extra-dim area on the basis of the information. In the blur mode, the reading position of the line sensor 40 is decided by the partitioned areas. In this embodiment, the reading position of the line sensor 40 for reading the extra-dim area is decided as the second position 32 and the reading position of the line sensor 40 for reading the intra-dim area is decided as the third position 33. Accordingly, the reading position of the line sensor 40 is changed in the course of reading the intra-dim area of the document and reading the extra-dim area. Therefore, the resolution of the line sensor 40 is changed in the intra-dim area and the extra-dim area to read the document. As a result, in the obtained document image, the occurrence of the moire is suppressed as a whole and an image in a partial area is blurred.

As described above, the scanner 10 is set to one of the normal mode, the moire reducing mode, and the blur mode. In the normal mode, the line sensor 40 is located by the controller 55 at the position where the first relative distance is substantially equal to the focal distance of the line sensor 40. Since the document is read in a state where the line sensor 40 is focused, a clear document image is obtained. In the moire reducing mode or the blur mode, the line sensor 40 is located by the controller 55 at a position where the first relative distance is different from the focal distance of the line sensor 40. Since the document is read in a state where the resolution of the line sensor 40 is deteriorated, a document image in which the occurrence of the moire is suppressed or a document image in which a partial image is blurred is obtained. The switching of the reading mode is performed on the basis of the operation input from the operation panel 13. That is, the resolution of the line sensor 40 is easily changed in accordance with a user's selection.

By setting one of the three reading modes, the controller 55 controls the CR motor 65 to change the first relative distance between the document reading surface 25 of the first glass 18 and the line sensor 40. That is, the first relative distance is changed by the use of the driving source of the line sensor 40. Accordingly, without adding a driving mechanism for changing the first relative distance between the line sensor 40 reading the conveyed document and the document reading surface 25, it is possible to read an image with high image quality in which the occurrence of the moire is suppressed.

Although it has been described in this embodiment that the extra-dim area of the document is read by the line sensor 40 located at the reading position corresponding to the second position 32, the extra-dim area of the document may be read by the line sensor 40 located at the reading position corresponding to the first position 31. That is, the image of the extra-dim area of the document may be read in the same way as the normal mode. In this case, the first white reference data 90 instead of the second white reference data 91 is used in the shading correction of the document image. The first coefficient 75 instead of the second coefficient 76 is used in the emphasis process on the document image.

The second glass 20 according to this embodiment may be configured to be vertically movable in the height direction of the scanner 10.

FIG. 19 is a diagram schematically illustrating a lifting mechanism 110 of the second glass 20.

As shown in FIG. 19, the lifting mechanism 110 includes a fixing member 111, a sliding member 112, supporting members 113 and 114, and coil springs 115, 116, 117, and 118. The supporting members 113 and 114 are fixed to both ends of the second glass 20 in the depth direction (direction indicated by the arrow 39) of the scanner 10. The fixing member 111 supports the supporting member 113 by the use of the coil springs 115 and 116. The fixing member 111 is fixed to the chassis 15. The sliding member 112 supports the supporting member 114 by the use of the coil springs 117 and 118. The sliding member 112 is disposed to be slidable relative to the chassis 15 in the depth direction of the scanner 10. A driving force is delivered to the sliding member 112 from a motor not shown. The sliding member 112 slides with the driving force. The fixing member 111 and the sliding member 112 are provided with tilted surfaces 118 and 119 going down to the second glass 20. A contact surface 120 parallel to the tilted surface 118 is formed in the supporting member 113. A contact surface 121 parallel to the tilted surface 119 is formed in the supporting member 114.

The sliding member 112 slides in a direction in which it gets close to the fixing member 111 (to the left side in FIG. 19) with the driving force from the motor. The supporting member 113 is pushed up on the tilted surface 118 and the supporting member 114 is pushed up on the tilted surface 119, thereby raising the second glass 20. The coil springs 115 and 117 are contracted with the raising of the second glass 20 to accumulate the spring force for pushing down the second glass 20. The coil springs 116 and 118 are expanded with the raising of the second glass 20 to accumulate the spring force for pulling down the second glass 20. The sliding member 112 slides in the direction (to the right side in FIG. 19) in which it gets apart from the fixing member 111 with the inverse rotation of the motor. The supporting members 113 and 114 go down along the tilted surfaces 118 and 119 with the spring force accumulated in the coil springs 115 to 118, thereby lowering the second glass 20.

As described above, the document reading surface 25 of the first glass 18 is tilted about the motion plane of the line sensor 40. Accordingly, the height of the reading surface 25 relative to the line sensor 40 is changed with the movement of the line sensor 40. By vertically moving the second glass 20 to allow the top surface of the second glass 20 and the reading surface 25 to be equal to each other in height, it is possible to change the reading mode in the FBS, thereby reading the document placed on the second glass 20. That is, in the FBS, it is also possible to read a document in the normal mode, the moire reducing mode, and the blur mode.

Second Embodiment

Hereinafter, a second embodiment of the invention will be described. The second embodiment is equal to the first embodiment in configuration, except for configurations of the first glass 18 and peripheries thereof and configurations of the reference member 37 and peripheries thereof, and thus description of the other configurations will be omitted.

FIGS. 20 and 21 are sectional diagrams schematically illustrating a part of the conveying passage 12 in the scanner 10 according to the second embodiment of the invention.

In the scanner 10 according to the second embodiment of the invention, the first glass 18 and the reference member 37 are parallel to the motion plane of the line sensor 40. On the rear surface of the guide member 34, first spacers 94 are disposed upstream and downstream in the document conveying direction of the first glass 18. The first spacers 94 are interposed between the carriage 41 and the first glass 18 in a state where the line sensor 40 is opposed to the first glass 18. The first spacers 94 are changed in thickness like a step in the moving direction (direction indicated by the arrow 38 in FIG. 20) of the line sensor 40. The first spacers 94 have a stepped portion 26 which increases in thickness from the upstream portion to the downstream portion in the conveying direction of the document conveyed by the ADF 28. On the other hand, the carriage 41 has stepped portions 50 at both ends in the longitudinal direction at which the rollers 30 are disposed. The stepped portions 50 are formed to gradually get higher from the downstream to the upstream in the conveying direction of the document conveyed by the ADF 28 so as to correspond to the stepped portions 26.

The guide shaft 42 is supported by the chassis 15 so as to be vertically movable in an upward biased state. The carriage 41 moves in the direction indicated by the arrow 38 so that the stepped portions 50 of the carriage 41 go down and up along the stepped portions 26. For example, the carriage 41 moves from the downstream to the upstream in the document conveying direction (see FIGS. 20 and 21). Accordingly, the height of the line sensor 40 mounted on the carriage 41 is changed. As a result, the first relative distance which is a relative distance between the line sensor 40 and the document reading surface 25 of the first glass 18 is changed from D5 to D6. Although a two-stepped portion 26 is formed in the first spacers 94 so as to change the first relative distance in two steps in FIGS. 20 and 21, The number of steps of the stepped portion 26 may be increased so that the first relative distance is changed in three or more steps.

Second spacers 96 are disposed at both ends of the reference member 37 in the width direction (direction indicated by the arrow 38) of the scanner 10. The second spacers 96 are interposed between the carriage 41 and the reference member 37 in a state where the line sensor 40 is opposed to the reference member 37. The second spacers 96 have the same shape as the first spacers 94. That is, the second spacer 96 is changed in thickness like a step in the moving direction (direction indicated by the arrow 38) of the line sensor 40. By allowing the line sensor 40 to move opposed to the reference member 37, the second relative distance between the line sensor 40 and the reading surface of the reference member 37 is gradually changed.

FIG. 22 is a sectional diagram schematically illustrating first spacers 104 and second spacers 106.

The first spacers and the second spacers of the invention are not limited to the first spacers 94 and the second spacers 96. That is, the first spacers and the second spacers may be the first spacers 104 and the second spacers 106, respectively, which are changed in thickness like a wedge in the moving direction of the line sensor 40, as shown in FIG. 22.

According to the embodiments of the invention, the image reading device is configured to read the conveyed document and the document placed on the second transmissive member. The line sensor is disposed at a position opposed to the first transmissive member by the driver at the time of reading the conveyed document. In the course of conveying the document along the path, the line sensor applies light to the document through the first transmissive member and reads the reflected light in the unit of a main scanning line. At the time of reading the document placed on the second transmissive member, the line sensor is made to move along the second transmissive member by the driver. In this course, the line sensor applies light to the document through the second transmissive member and reads the reflected light in the unit of a main scanning line. The driver is driven by the control unit. With this driving, the relative distance between the reading surface of the document in the first transmissive member and the line sensor is changed. That is, the relative distance is changed by the use of a single driving source of the line sensor.

A reading surface of the first transmissive member may be tilted about a plane in which the line sensor moves.

According to the above-mentioned configuration, it is possible to easily change the relative distance without adding a new member for changing the relative distance.

A downstream portion of the reading surface of the first transmissive member in a conveying direction of a document in the passage may be positioned to have larger distance from the plane in which the line sensor moves than an upstream portion thereof.

According to the above-mentioned configuration, the conveyed document contacts with the first transmissive member and is pressed thereon. Accordingly, it is possible to keep the relative distance by inhibiting the floating of the document from the first transmissive member.

The image reading device may further include a first spacer of which the thickness varies like a step or like a wedge in a direction in which the line sensor moves and which is interposed between the carriage and the first transmissive member in a state where the line sensor is opposed to the first transmissive member.

The first spacer is changed in thickness like a step or like a wedge in the moving direction of the line sensor. Accordingly, the line sensor gets close to or apart from the first transmissive member as it is moved by the driving unit.

The control unit may control the line sensor to perform an operation of reading a test document having a predetermined pattern recorded thereon through the first transmissive member at a plurality of positions which are different from each other in the relative distance and may include a calculation unit that calculates modulation transfer function (MTF) values at the plurality of positions on the basis of an image signal of the test document obtained from the operation and a determination unit that determines a reading position at which the line sensor is disposed by the driver on the basis of the calculated MTF values at the time of reading a document through the first transmissive member.

The test document has, for example, a white and black pattern recorded thereon. The test document is read by the line sensor through the first transmissive member. The line sensor is made to move relative to the first transmissive member by the driver. The position of the line sensor relative to the first transmissive member is changed and the test document is read by the line sensor. Accordingly, an image signal of the test document is obtained every position at which the line sensor is disposed. The MTF value is calculated every position of the line sensor on the basis of the image signals and the reading position is determined on the basis of the MTF values. The conveyed document is read by the line sensor through the first transmissive member in a state where the line sensor is disposed at the reading position.

The reading position may be a position at which the MTF value is the maximum.

According to this configuration, the document is read in a state where the line sensor is focused. Accordingly, it is possible to obtain a clearer image of a document, compared with a case where the line sensor is disposed at a different position to read a document.

On the condition that the same MTF value is calculated plural times by the calculation unit, the determination unit may determine as the reading position a position corresponding to the same MTF value at which the relative distance is smaller.

Accordingly, even when the document rises up from the first transmissive member, it is possible to prevent the read image of the document from being extremely unclear.

The image reading device may further include a reference member as a brightness reference of the line sensor that is read by the line sensor. Here, the control unit may change a relative distance between the reading surface of the reference member and the line sensor by actuating the driving unit.

According to the above-mentioned configuration, it is possible to allow the distances to the reference member and the reading surface to be equal to each other. Accordingly, it is possible to prevent an intensity difference between the light intensity for allowing the line sensor to read a document through the first transmissive member and the light intensity for allowing the line sensor to read the reference member.

The reading surface of the reference member may be tilted about the plane in which the line sensor moves.

According to this configuration, it is possible to easily change the relative distance without newly adding a member for changing the relative distance between the line sensor and the reference member.

The image reading device may further include a second spacer of which the thickness varies like a step or like a wedge in the direction in which the line sensor moves and which is interposed between the carriage and the reference member in a state where the line sensor is opposed to the reference member.

The second spacer is changed in thickness like a step or like a wedge in the moving direction of the line sensor. Accordingly, the line sensor gets close to or apart from the reference member as it is moved by the driving unit.

According to the embodiments of the invention, the relative distance between the reading surface of the document in the first transmissive member and the line sensor is changed by the drive of the driver of the line sensor. Accordingly, a relative distance can be changed by simple configurations that do not require another driving mechanism in addition to the driver. Therefore, the image reading device changeable the relative distance can be produced at a lower cost.

What is claimed is:

1. An image reading device comprising:
   a conveying unit configured to convey a recording medium on a first path;
   a first transmissive portion having a first surface that allows the recording medium to pass through the first surface;
   a second transmissive portion having a second surface on which a recording medium is allowed to be placed;
   an image reading unit comprising a line sensor extending in a first direction and movable on a second path, the second path continuously extending below the first transmissive portion and below the second transmissive portion, the image reading unit configured to read an image of the recording medium passed through the first surface and an image of the recording medium placed on the second surface; and
   a driver configured to move the image reading unit on the second path,
   wherein the second path below the second transmissive portion extends along the second surface in a second direction perpendicular to the first direction, and
   wherein a relative distance of a third direction perpendicular to the first and second directions between the line sensor and the first surface changes in the second path below the first transmissive portion.

2. The image reading device according to claim 1, wherein the first surface of the first transmissive surface is tilted with respect to the second path below the first transmissive portion.

3. The image reading device according to claim 2, wherein an upstream end of the first surface in a conveying direction of the recording medium in the first path is spaced from the line sensor with a first relative distance, and a downstream end of the first surface in the conveying direction is spaced from the line sensor with a second relative distance that is larger than the first relative distance.

4. The image reading device according to claim 3, wherein the second path below the first transmissive portion and the second transmissive portion extends in the second direction along a flat plane parallel to the second surface.

5. The image reading device according to claim 4, wherein the recording medium is discharged from the first path to a discharge portion that is positioned spaced from the line sensor with a third relative distance larger than the second relative distance.

6. The image reading device according to claim 1, further comprising a first spacer having a thickness in the third direction which varies along the second direction, the first spacer interposed between the image reading unit and the first transmissive portion in a state where the line sensor is opposed to the first transmissive portion.

7. The image reading device according to claim 6, wherein the first spacer has a step shape or a wedge shape.

8. The image reading device according to claim 6,
   wherein the image reading unit is movably supported in the third direction, and wherein the first spacer applies a force to the image reading unit to move the image reading unit in the third direction.

9. The image reading device according to claim 1, further comprising a control unit configured to control the line sensor to perform an operation of reading a test document having a predetermined pattern recorded thereon through the first transmissive portion at a plurality of positions, wherein, at the plurality of positions, the different relative distances of the third direction perpendicular to the first and second directions between the line sensor and the first surface are different from one another, and
wherein the control unit comprises:
a calculation unit configured to calculate modulation transfer function (MTF) values at the plurality of positions based on an image signal of the test document obtained from the operation; and
a determination unit that determines, based on the calculated MTF values, a reading position at which the line sensor is disposed by the driver at a time of reading the recording medium through the first transmissive portion.

10. The image reading device according to claim 9, wherein the reading position is a position at which the MTF value is the maximum.

11. The image reading device according to claim 9, wherein, on the condition that a same MTF value is obtained for a plurality of positions by the calculation unit, the determination unit determines, as the reading position, a position corresponding to the same MTF value at which the relative distance is smaller.

12. The image reading device according to claim 1, further comprising a reference portion as a brightness reference of the line sensor to be read by the line sensor,
wherein the second path continuously extends below the reference portion,
wherein a relative distance of the third direction between the line sensor and the reference portion changes in the second path below the reference portion.

13. The image reading device according to claim 12, wherein the reference portion is tilted with respect to the second path below the reference portion.

14. The image reading device according to claim 12, further comprising a second spacer having a thickness in the third direction which varies along the second direction, the second spacer is interposed between the image reading unit and the reference portion in a state where the line sensor is opposed to the reference portion.

15. The image reading device according to claim 14, wherein the second spacer has a step shape or a wedge shape.

16. The image reading device according to claim 14,
wherein the image reading unit is movably supported in the third direction, and
wherein the second spacer applies a force to the image reading unit to move the image reading unit in the third direction.

17. The image reading device according to claim 1,
wherein the image reading unit opposes to the first surface in a predetermined range in the second direction,
wherein the relative distance changes depending on a position of the image reading unit with respect to the second direction.

18. An image reading device comprising:
a conveying unit configured to convey a recording medium on a first path;
a transmissive portion having a first surface disposed in a middle of the first path to allow the recording medium to pass through the first surface;
an image reading unit comprising a line sensor extending in a first direction and movable along the first surface in a second direction perpendicular to the first direction, the line sensor configured to read an image of the recording medium passed through the first surface at a reading position; and
a driver configured to move the image reading unit in the second direction,
wherein a relative distance of a third direction perpendicular to the first and second directions between the line sensor and the first surface changes depending on positions with respect to the second direction of the image reading unit.

19. The image reading device according to claim 18, further comprising a control unit configured to drive the driver,
wherein the control unit drives the driver to position the image reading unit at the reading position having a predetermined relative distance when the image unit reads the image of the recording medium.

20. The image reading device according to claim 18, wherein the first surface is tilted with respect to the second direction.

* * * * *